(12) United States Patent
Jaszlics et al.

(10) Patent No.: US 12,509,243 B2
(45) Date of Patent: Dec. 30, 2025

(54) AUTOMATED TOWED GLIDER CONTROL SYSTEM

(71) Applicant: Pathfinder Systems, Inc., Lakewood, CO (US)

(72) Inventors: Ivan J. Jaszlics, Golden, CO (US); Sheila L. Jaszlics, Golden, CO (US)

(73) Assignee: Pathfinder Systems, Inc., Lakewood, CO (US)

( * ) Notice: Subject to any disclaimer, the term of this patent is extended or adjusted under 35 U.S.C. 154(b) by 0 days.

(21) Appl. No.: 18/740,999

(22) Filed: Jun. 12, 2024

(65) Prior Publication Data

US 2024/0417103 A1    Dec. 19, 2024

Related U.S. Application Data

(60) Provisional application No. 63/472,928, filed on Jun. 14, 2023.

(51) Int. Cl.
*B64D 47/08* (2006.01)
*B64D 3/02* (2006.01)

(52) U.S. Cl.
CPC .............. *B64D 47/08* (2013.01); *B64D 3/02* (2013.01)

(58) Field of Classification Search
CPC .................................. B64D 47/08; B64D 3/02
See application file for complete search history.

(56) References Cited

U.S. PATENT DOCUMENTS

| | | | |
|---|---|---|---|
| 2,373,236 A | 4/1945 | Effinger | |
| 2,432,548 A | 12/1947 | Taylor | |
| 3,102,703 A | 9/1963 | Armstrong et al. | |
| 3,113,747 A | 12/1963 | Smith | |
| 4,248,394 A | 2/1981 | Klumpp | |
| 4,688,022 A | 8/1987 | Gray | |
| 5,188,313 A | 2/1993 | Piasecki | |
| 8,910,902 B2 | 12/2014 | Speer | |
| 9,323,236 B2 | 4/2016 | Plough | |
| 9,592,890 B2 | 3/2017 | Christensen | |
| 11,500,120 B2 | 11/2022 | Andreasen | |
| 2011/0139928 A1* | 6/2011 | Morris | B64D 39/00 244/3 |
| 2015/0046017 A1* | 2/2015 | Torti | G01C 21/188 701/25 |
| 2016/0039300 A1* | 2/2016 | Wang | B60L 53/80 244/58 |
| 2016/0194080 A1 | 7/2016 | Webb | |
| 2023/0415891 A1* | 12/2023 | Allwein | G01S 19/43 |

FOREIGN PATENT DOCUMENTS

WO    WO2019/155132 A1    8/2019

* cited by examiner

*Primary Examiner* — Kathleen V Nguyen
(74) *Attorney, Agent, or Firm* — Thomas S. Birney; Cochran Freund & Young LLC

(57) ABSTRACT

An automated control system for a glider towed by a tug employs a camera mounted on one of the aircraft to view the other (the "target"). An optical recognition system receives images from the camera and determines the relative range and bearing of the target. A controller determines corrections to the flight characteristics of the glider in response to the range and bearing data from the optical recognition system. An interface to the flight controls of the glider maintains the desired flight characteristics of the glider provided by the controller.

14 Claims, 21 Drawing Sheets

AUTOMATED TOWED GLIDER CONTROL SYSTEM

BACKGROUND OF THE INVENTION

Field of the Invention

The present invention relates generally to the field of automated control systems for towed gliders or unmanned air vehicles (UAV).

Background of the Invention

Unpowered gliders have existed for many years. Gliders are typically towed by a powered tug aircraft (tug) until the glide is released from the tug for independent flight. Both the tug and glider have pilots in this conventional arrangement. The present invention provides an automated glider control system during the air tow phase.

The primary objective of the present system is to avoid undesired termination of the air tow of a UAV glider. This may happen as a consequence of atmospheric turbulence or other random events and may lead to catastrophic loss of the glider or the tug. The present system aims to achieve this objective by generating autopilot control sequences that are generic in nature and are independent of any specific autopilot, UAV glider, or tug type. Onboard flight computers can create command sequences for use by autopilot systems, which can turn those sequences into control movements. Control during air tow requires special control sequences that are not normally provided by autopilots or flight computers. The present system creates autopilot commands like required speed, altitude, or glider orientation to position the glider from occasional incorrect positions behind the tug to a correct position (see, position T in FIG. 16) without imposing excessive loads on the glider's or tug's structures.

SUMMARY OF THE INVENTION

This invention provides an automated control system for a glider towed by a tug. A camera is mounted on at least one of the aircraft to view the other (the "target"). An optical recognition system receives images from the camera and determines the relative range and bearing of the target. A controller determines corrections to the flight characteristics of the glider in response to the range and bearing data from the optical recognition system. An interface to the flight controls of the glider maintains the desired flight characteristics of the glider provided by the controller.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Table 1 lists terms, abbreviations, and acronyms that are characteristic of or aid in describing the present invention.

TABLE 1

| Term, Abbreviation, or Acronym | Description |
| --- | --- |
| Air Tow | The ensemble of one or more tug(s) towing glider(s) |
| Autopilot | Automated system onboard the glider to implement control |
| BF, Breaking Force | Breaking force of the weak link |
| Control Directive | Instruction to an autopilot to execute control sequences |
| Fiducial Mark, Fiducial | Digital mark of defined size and angular orientation |
| Flight Computer | An onboard computational system that can generate autopilot commands |
| Glide Ratio | How far an aircraft can glide in still air without power (=L/D) |
| Glider | Aircraft without onboard propulsive power |
| Glider Hook Point, GHP | The point at which the weak link is attached to the glider |
| Ground-based Calibration | An optional calibration subsystem not included in the ATGCS |
| L/D | See Lift-to-Drag Ratio |
| Lift-to-Drag Ratio | The lift force divided by the aerodynamic drag force |
| Limit Sphere, LS | Approximately half-spherical surface of limited thickness centered on the TAP |
| Maximum Tow Force | The largest permissible tow force that is permitted by the weak link |
| Minimum radius of LS | The radius of the limit sphere with the minimum tow force exerted |
| Minimum Tow Force | The lowest tow force when the glider is still on the limit sphere |
| Normal Tow Force | Tow Force equal to the aerodynamic drag of the Glider |
| Optimal Target Zone | Optimal location of the GHP on the Limit Sphere |
| Sailplane | An alternative term for a glider; used for gliders with high L/D |
| TAS, CAS | TAS = True airspeed, CAS = indicated airspeed corrected for instrument errors |
| Tow Force, $F_T$ | The tensile force exerted upon the tow rope, cable or rod |
| Tow Rod | An alternative means to tow cable for towing a glider |
| Tow Rope or Cable | A flexible cable or rope by which the tug tows glider(s) |
| Towing, Tow | see air tow |
| Tug Attachment Point, TAP | The attachment point of the tow table or row rod on the tug |
| Tug-based Calibration System | An optional calibration system component of the control system in the glider |
| Tug | Powered aircraft towing one or more glider(s) |
| UAV | Unmanned air vehicle |
| UUAV, UAV Glider | Unmanned, unpowered aerial vehicle |
| Undesired Termination of tow | Result of exceeding weak link, tug, or glider load limits |
| Weak Link | Insert at the glider end of the tow rope or tow rod |

Figure 15:
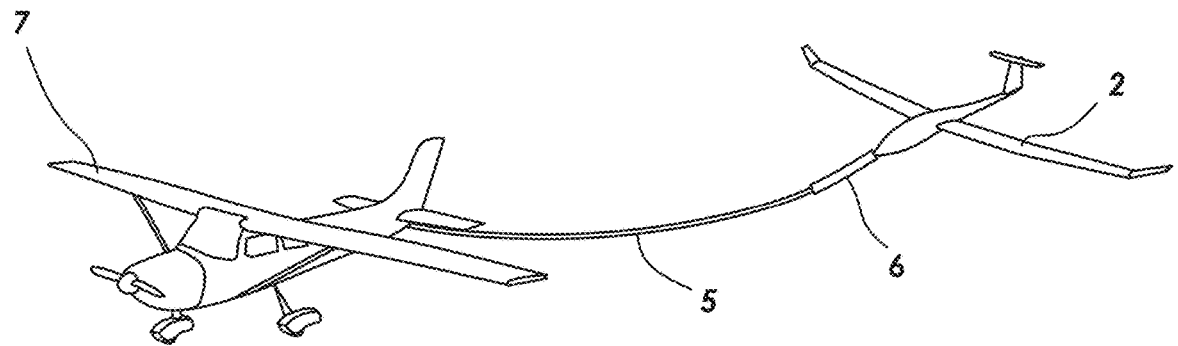
FIG. 15 shows a conventional air tow with a single tug 7 and a single glider 2.
Figure 17A:
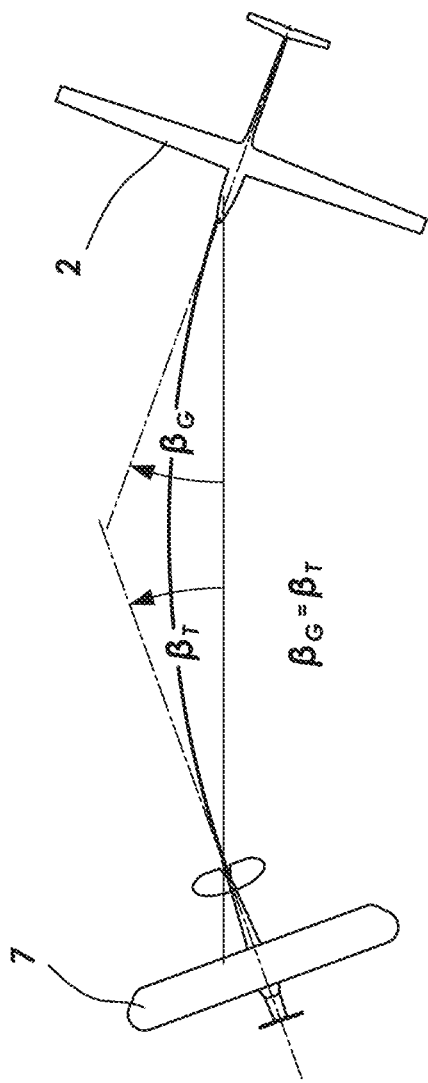
FIGS. 17A and 17B are diagrams illustrating the lateral position of the target towing spot.
Figure 17B:
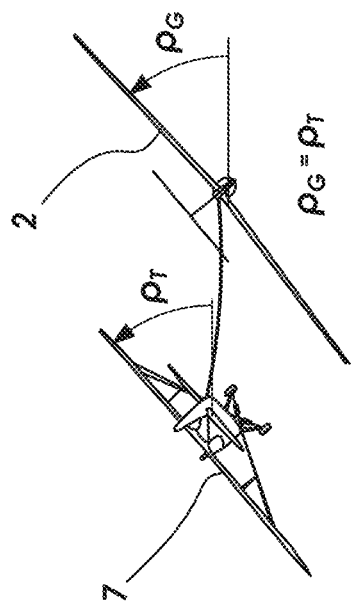

FIG. 15 shows a conventional air tow with a single tug 7 and a single glider 2. The tug 7 may be manned or unmanned. The glider 2 is assumed as unmanned, controlled by the present automated control system. One or more unmanned gliders (or UAVs) 2 are towed by the tug 7 by means of a tow rope, cable or rod 5 (hereinafter referred to as the tow rope). The length of the tow rope 5 defines a partial limit sphere 16. The attachment of the tow rope 5 to the glider 2 is normally on the surface of this partial sphere 16 and is furthermore within an optimal target zone to assure minimal structural loads on the tug 7, glider 2 and tow rope 5. The row rope 5 may include a weak link 6 designed to break before the loads imposed on the glider or the tug would exceed structural limitations. A break of the weak link 6 or the tow rope 5 results in an undesired termination of tow. Within the optimal target zone, a target towing spot is defined. When the air tow proceeds in a straight line, the target towing spot is on the intersection of the vertical plane of symmetry of the limit sphere (LS) 16. When in a turn, the bank angle of the slider ($\rho_G$ in FIGS. 17A and 17B) must match the bank angle of the tug ($\rho_T$) to ensure that the tug and glider turn on a circle of the same radius. Furthermore, to ensure that the turning circle of the tug and the turning circle of the glider have the same center, the angle $\beta_G$ enclosed between the glider's centerline and the direction from the glider to the tug must match the angle between the tug's centerline and the direction from the tug to the glider, as shown in FIGS. 17A and 17B.

Figure 16:
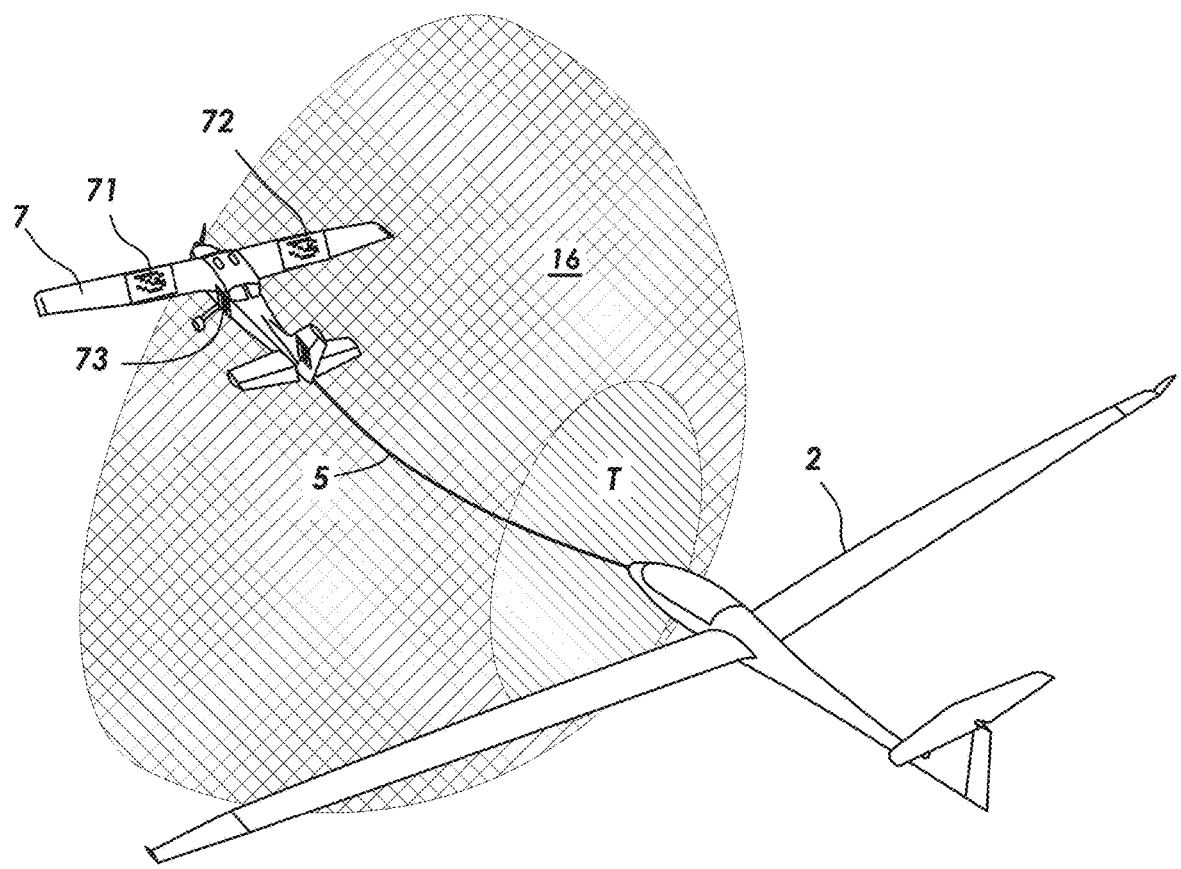
FIG. 16 is a simplified diagram of the positioning tug 7, glider 2 and limit sphere 16 in an air tow.

The present invention (as shown in FIG. 16) provides a control system to maintain the position of an unmanned (or manned) glider 2 relative to one or more tug(s) 7 to prevent undesired or catastrophic termination of the tow. The invention may be implemented without any active components (such as radars or light emission) and requires, in its simplest implementation, no assistance from or communications with the tug 7. It can be located entirely onboard the glider 2, or its components can be divided between the glider and tug.

The control surfaces of the glider 2 are typical of current production gliders or sailplanes, including conventional ailerons, rudder and elevator. These control surfaces provide the three-dimensional control capabilities of aircraft. However, the present system is independent of the specific control surfaces and applies equally to other means of longitudinal and lateral control (for example, elevons or canards, differential spoilers, flaperons, or elevons). The glider can also be equipped with optional flaps and dive brakes. Dive brakes, in their effect, are similar to symmetrical spoiler extension on modern airliners. They drastically increase the aerodynamic drag of gliders, thereby reducing the lift-to-drag ratio (L/D) from up to 60:1 or higher to the order of 10:1 or lower.

Although the technical state of the art at the time of this disclosure suggests implementation as an industrial process in the form of a digital, electro-mechanical, software-driven system, other implementations (for example, an analog system or hydraulic components) are equally possible.

To achieve the objective of avoiding unintended termination of the air tow, the present system performs two basic functions: (1) Position the glider in a location on the limit sphere 16 from which location the control system can respond near-optimally to tug maneuvers and gust effects; and (2) Recover from the slack mode described below while staying as close as possible to the normal tow force, that is the glider's aerodynamic drag.

Towing of gliders 2 can be achieved by one or more gliders being towed by a single tug 7 or a single glider being towed by more than one tug. Air tow is performed in up to three (3) modes: direct towing mode; slack mode; and unintended termination mode. The limit sphere 16 is a partial sphere centered on the tug's tow cable attachment point, with its radius defined by the tow cable's length. In the slack mode, the glider is inside of the limit sphere 16. In direct towing mode, it is on the surface of the limit sphere. The only way to be outside of the limit sphere is termination of the tow, whether it is intentional or not. In a steady-state direct towing mode, the force applied to the tow cable 5 is closely equal to the glider's aerodynamic drag, which is the glider's weight divided by its L/D at the speed of the air tow. During recovery from the slack mode, there may be a large inertial force applied to the cable if the glider impacts the limit sphere at a high speed. The objective of the present control system is consequently reduced to achieving a "soft landing" on the limit sphere as the glider returns from the slack mode.

In direct towing mode, the tug 7 provides the propulsive force for the glider. This mode has to prevail during air tow, as the glider 2 has no propulsive power source of its own. In the direct towing mode, the glider must be on a partial spherical surface, the limit sphere 16, whose radius is approximately the length of the tow rope. The center of the limit sphere is at the attachment point of the tow rope 5 on the tug 7. A tow rope 5 with no weight and experiencing no air resistance would be a straight line. In the real world, it is a catenary curve modified by the tow rope's weight and aerodynamic drag.

When the glider 2 is in the tug's plane of symmetry in the direct towing mode, only the longitudinal forces and moments are considered. The aerodynamic drag of the glider 2 is equal to the horizontal component of the tensile force in the tow rope, and the aerodynamic lift is equal to the weight of the aircraft plus the downward component of the tensile force in the tow rope. When the glider 2 is offset from the tug's plane of symmetry, the glider 2 will need to fly in a side slip. The lateral component of the tow rope's tensile force is matched by the lateral aerodynamic forces of the glider. While moving the glider up or down, it may be separated from the limit sphere unless adequate aerodynamic drag is created by forward slip, opening a dive brake, or other drag-increasing device that keeps the glider on the limit sphere. Lateral motion is controlled by sideslip or bank towards the desired direction; this also may separate the glider from the limit sphere. Although FIG. 15 illustrates a glider with a tow rope 5 attached at the forward extremity, in actual practice, an attachment near the center of gravity may be used, known as the CG hook attachment.

Figure 18A:
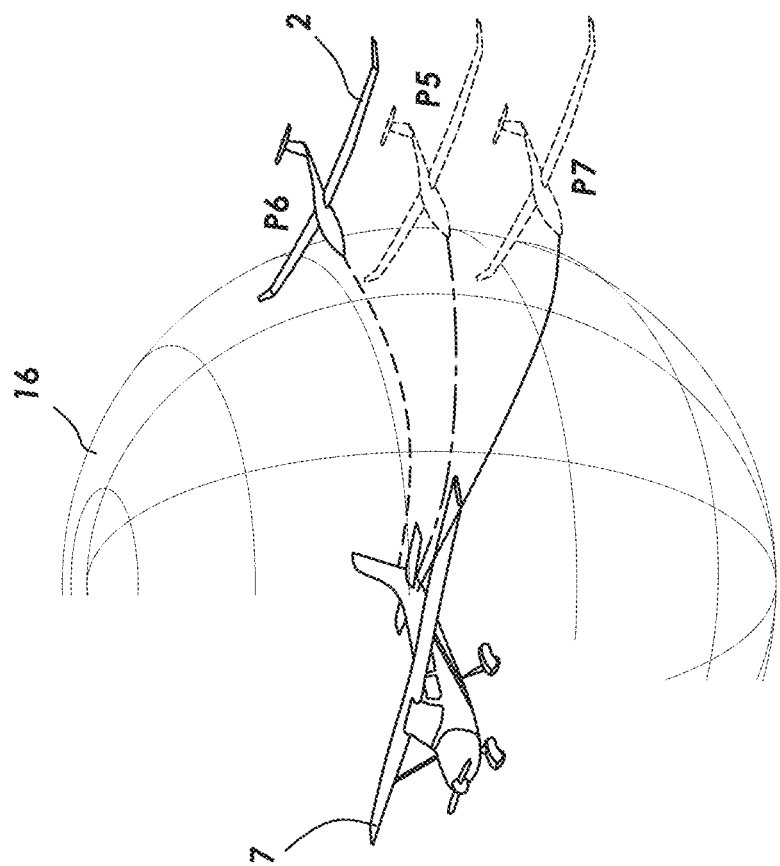
FIGS. 18A and 18B are diagrams illustrating movement of a glider 2 to and on the limit sphere 16.
Figure 18B:
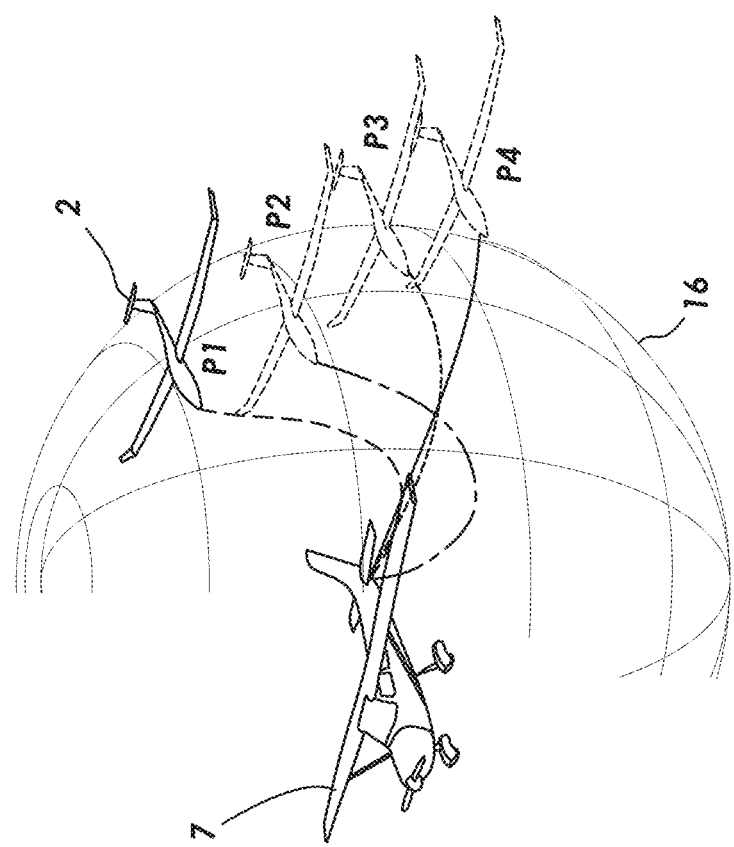
Figure 19A:
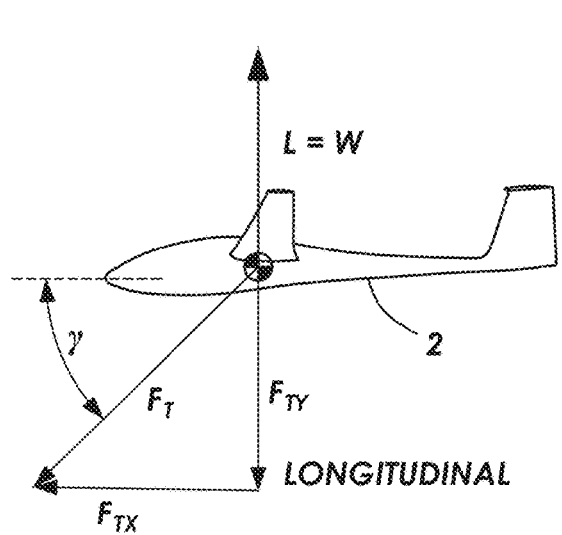
FIGS. 19A and 19B are diagrams showing the forces exerted on a glider 2 in equilibrium on the limit sphere 16.
Figure 19B:
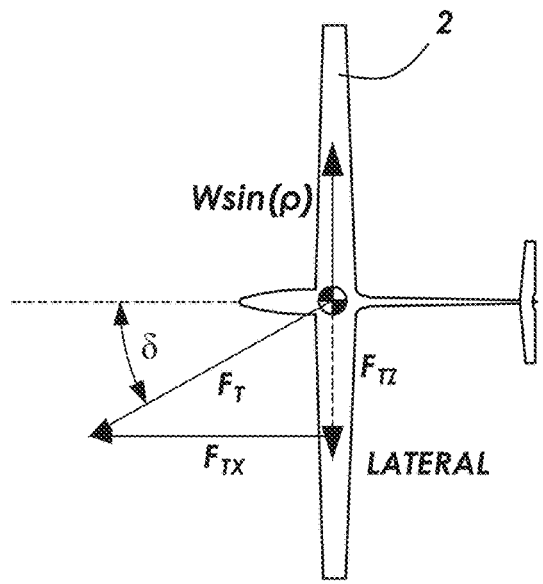

FIG. 18A shows the glider 2 in the slack mode. Here, the glider 2 is inside the limit sphere 16 due to atmospheric or other disturbances, with no towing force on the control cable. For example, the glider 2 is in free flight in the positions indicated by P1, P2, and P3 as shown in FIG. 18A and is settled on the limit sphere 16 in position P4. In the P4 position, the tow cable 5 exerts a force on the glider and the tug 7 that is equal to the aerodynamic drag of the glider plus the inertial force resulting from settling on the limit sphere. FIG. 18B shows the glider in "equilibrium towing" when the towing force approximately equals the aerodynamic drag of the glider. This is an approximation for equilibrium flight. More precisely, FIG. 19A shows the horizontal component of the towing force to be equal to the aerodynamic drag of the glider: $F_{TX}=D=W/(L/D)$ where L/D is the lift-to-drag ratio of the glider and W is its weight. The vertical component is $F_{TY}=F_T \times \mathrm{Tan}(\gamma)$, where $\gamma$ is the angle of elevation of the glider above the horizontal plane of the tug's attachment. Consequently, $\gamma=\mathrm{Atan}(W/(L/D))$, limiting the forward boundary of the limit sphere to somewhat aft of the tug's hook attachment. FIG. 19B shows the equilibrium of lateral forces for the case when the glider is offset from the plane of symmetry of the limit sphere. The lateral component of the tow force is $F_{TZ}=F_T \times \mathrm{Tan}(\delta)=(W/(L/D)) \cdot \mathrm{tan}(\delta)$, where $\delta$ is the bank angle away from the plane of symmetry of the limit sphere. Consequently, $\delta$ is limited similarly to the angle $\gamma$, that is, to less than a full hemisphere aft of the tug's tow cable attachment. The relationship between the aerodynamic drag of the glider (or any aircraft) is shown in the polar diagrams of FIGS. 21A and 21B.

The transition to the slack mode requires speed gain over the true air speed (TAS) of the tug. The glider can achieve this either intentionally by increasing its speed by exchanging altitude loss for speed gain (Equation 4 below) or accidentally when entering a gust; the excess energy gained by entering the gust is converted into speed. When a gust is entered, the higher sink rate of the tug due to its lower L/D (see Equation 1 below) will result in less altitude gain and, therefore, less speed gain when intending to hold a constant altitude. The glider, therefore, moves forward faster than the tug after entering the gust and enters inside the limit sphere when it attempts to hold altitude. This differential in sinking speeds shows up even if the tug accepts the altitude change, and it also shows up whether the air tow enters updrafts or downdrafts. In essence, the glider will accelerate forward, into the inside of the limit sphere in gusty conditions. In the resulting slack mode, the glider is now in free flight: having no propulsive force applied through the tow rope, it will descend relative to the tug. If no pilot action, or in the case of UAV gliders, no autopilot action is taken, the resulting shock, when the glider reaches the limit sphere, may result in tow rope failure or even structural damage to the glider or the tug.

Figure 20:
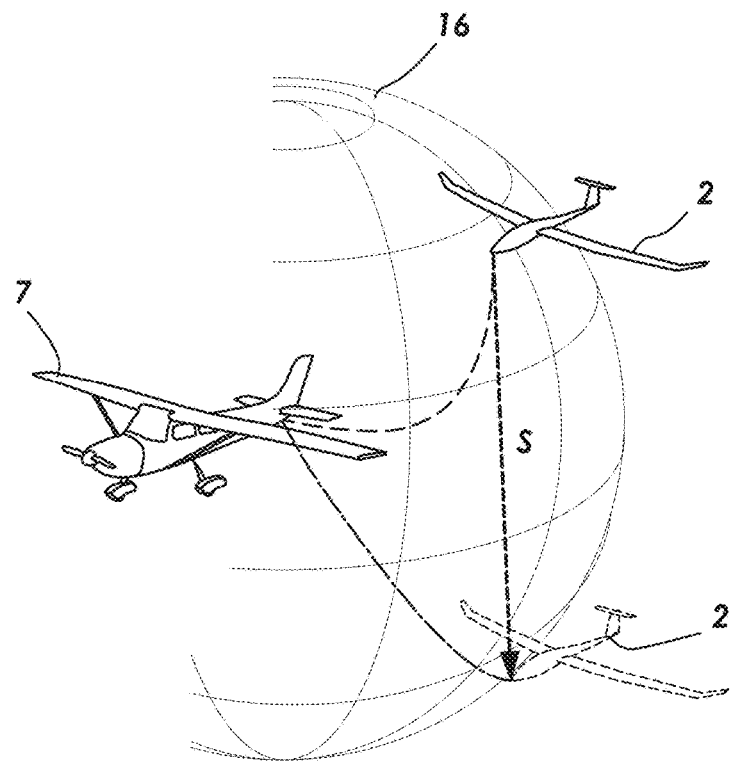
FIG. 20 is a diagram illustrating the behavior of the glider 2 in the slack mode.

Glider behavior in the slack mode is only a temporary event because the glider is now in free gliding flight, continuously losing altitude at a descent rate (or sink rate) S (see FIG. 20). The sink rate is equal to the true airspeed (TAS) of the glider divided by its lift-to-drag ratio (L/D) at that airspeed. As an example, in the case of a Schempp-Hirth Discus II, the highest L/D is 44:1. At a tow speed of 40 m/sec (approximately 78 knots TAS at 6,000 m above sea level), S=40/44=0.9 m/sec. This descent speed can be increased by the use of dive brakes, a common control in manned gliders that reduces the L/D significantly, increasing the descent speed S without speed gain to around 4 m/s.

$$S = TAS/(L/D) \qquad \text{Equation 1}$$

Figure 21A:
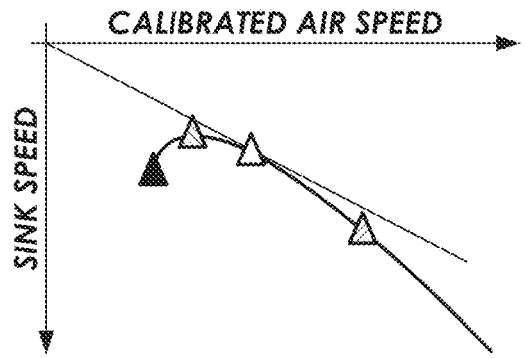
FIGS. 21A and 21B are graphs showing the function of sink speed versus forward speed in a dimensionless form.
Figure 21B:
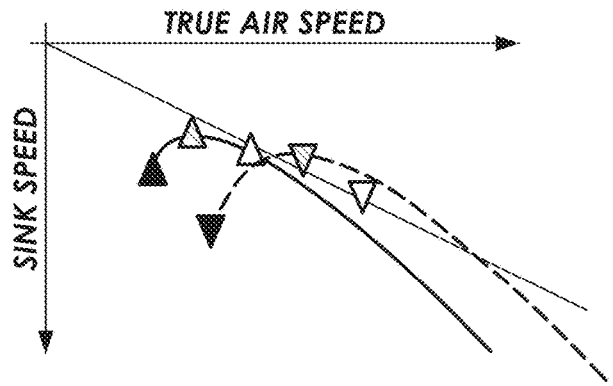

Aerodynamics of the Glider in the Slack Mode. The glider is in free gliding flight, without any power in slack mode. The aerodynamics is, therefore, the same as for any aircraft in unpowered flight. The polar diagrams in FIGS. 21A and 21B show the function of sink speed versus forward speed in a dimensionless form. The black triangle indicates the stall speed, the gray-striped triangle is at its lowest sinking speed, and the white triangle shows the speed for the best L/D (speed of the flattest glide). At each forward speed value, such as at the speed marked as "Some Other Speed," the sink speed is S=TAS/(L/D), where L/D is the glide ratio (or lift-to-drag ratio) of the aircraft at that TAS. The actual values of each speed on the polar diagram are obtained by Equation 2.

$$TAS = \sqrt{\left(\frac{2}{\rho}\right)\left(\frac{W}{S}\right)\left(\frac{1}{C_L}\right)} \qquad \text{Equation 2}$$

The symbols in Equation 2 are: $\rho$=air density, W=glider weight, S=glider lifting surface area, and $C_L$=non-dimensional lift coefficient. The term W/S is also called the wing loading. Note that while the energy conversion from speed to altitude gain or loss takes place in terms of true airspeed (TAS), the fight characteristics of any aircraft are dependent on the calibrated airspeed (CAS), as shown in Equation 3.

$$L = nW = \left(\frac{\rho}{2}\right) CAS^2 S C_L \qquad \text{Equation 3}$$

The symbol L represents the lift force, and n indicates the normal (perpendicular to the aircraft's flight path) multiplier of the acceleration of gravity. For example, the minimum (stall) speed of the aircraft will correspond to the maximum value of the lift coefficient $C_L$. The drag equation is identical to Equation 3, except the drag coefficient $C_D$ replaces $C_L$.

Effects of Weight and Air Density on the Polar Diagram. When the glider needs to move forward in the slack mode, it will need to increase its speed. For example, if it was at its best glide speed, $TAS_1$, it would need to move on the polar diagram to some other speed, $TAS_2$. The following characteristics of the polar diagram will affect the altitude loss or gain DH specified below in accordance with Equation 2, and as illustrated in FIGS. 21A and 21B: (a) The best L/D value does not depend on the wing loading W/S or the air density $\rho$; (b) For each lift coefficient ($C_L$) value the sinking speed S and forward speed are proportional to the square root of the wing loading divided by the square root of the air density $\rho$. In practical terms, in an earth atmosphere, this means: (c) The higher the "density altitude," the higher the speed in free flight, and (d) The higher the wing loading, the higher the speed in free flight.

Moving Forward or Aft relative to the Limit Sphere in the Slack Mode. When the glider needs to move forward in the slack mode, it will need to increase its speed. If it was at true air speed $TAS_1$, it would now need to move on the polar diagram to some other speed $TAS_2$. The increase of kinetic energy from $TAS_1$ to $TAS_2$ is obtained by Equation 4. This equation also holds true for moving aft, in which case altitude gain results from loss of speed.

$$DH = (TAS_2^2 - TAS_1^2)/(2g) \qquad \text{Equation 4}$$

In Equation 4, g is the acceleration of gravity (about 9.8 m/s²). The equation is approximate in that it only applies to an infinite lift-to-drag ratio. Actual altitude loss will be higher by the integral of the aerodynamic drag along the path taken from the point in aerodynamic space where the state is still $TAS_1$ to the point where $TAS_2$ is achieved.

Avoiding Large Accelerations when Returning from Slack State. When returning from the slack mode to the limit sphere, the practical problem of avoiding large acceleration arises. The process requires moving from position P1 in FIGS. 18A and 18B to the final desired position P6 on the limit sphere—that is, to the normal air tow position with no slack. It is performed in two phases. In phase 1, the slack is removed by diving down from the high tow position with large slack (P1) to the low tow position P4. The pitch angle of the glider is controlled by observing the amount of slack in pilot-controlled flight or by measuring the distance between the sensors and the tug attachment point, then applying control inputs to make sure that the amount of slack is becoming less and less at a slower and slower rate until all slack is taken out with a near-zero slack reduction rate. When P4 is reached, the second phase begins by applying up elevator. The glider climbs up (or descends down, if above) to the optimal target zone T shown in FIG. 16 to the desired tow position P6. If P1 is offset from the tug's plane of symmetry, the optimal strategy is to move back to that plane during phase 1 before climbing up (or down) to P6 from P4.

Figure 1:
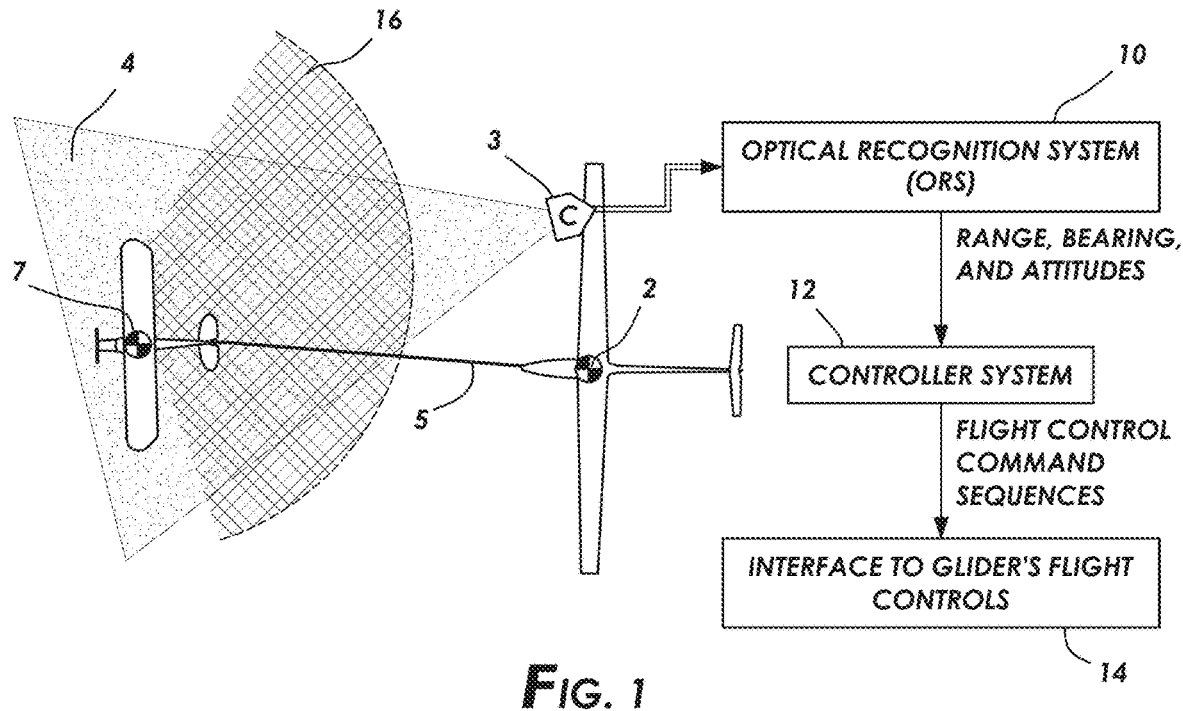
FIG. 1 is a diagram showing an overview of the present system.
Figure 25:
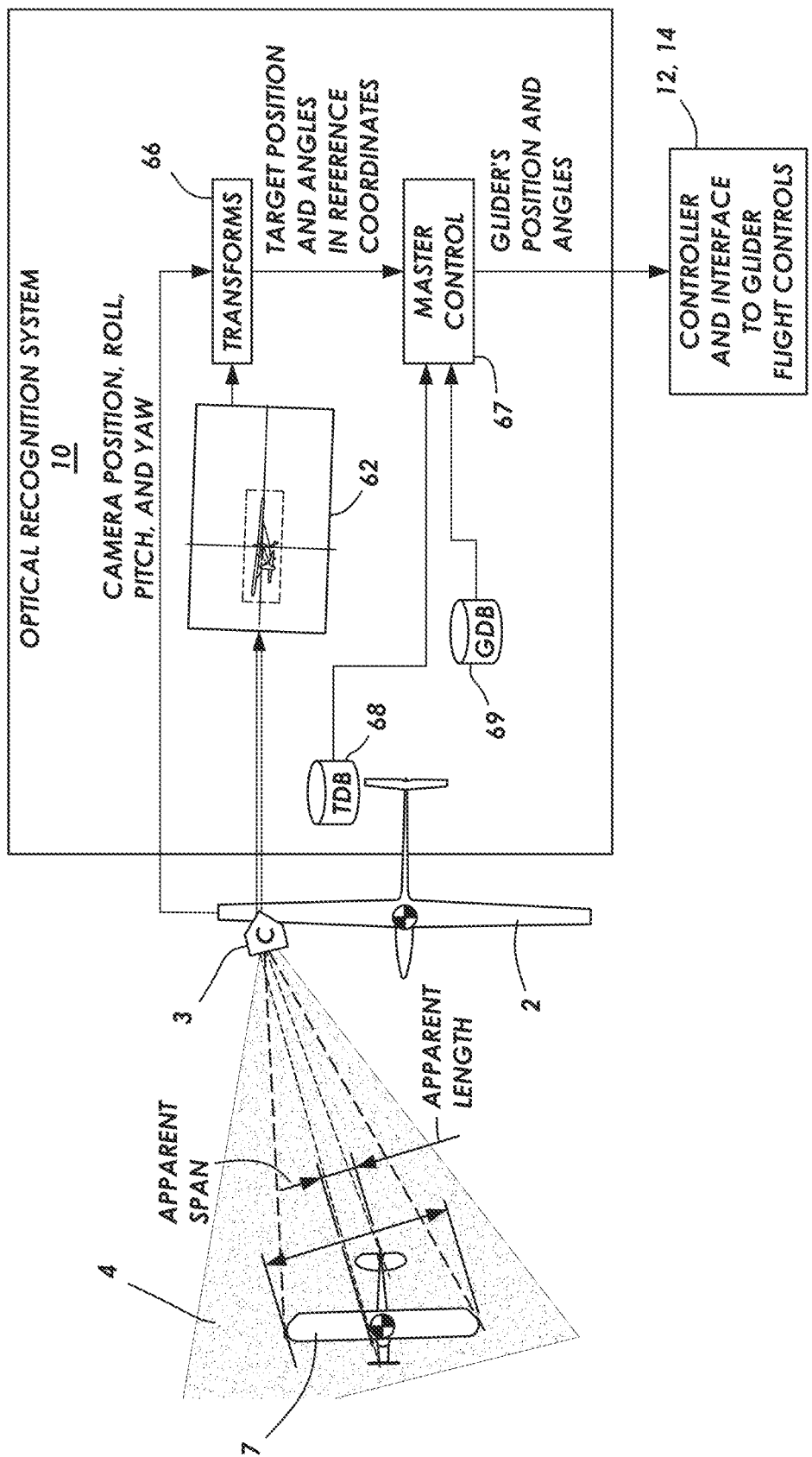
FIG. 25 is a block diagram illustrating distance estimate by the optical recognition system 10 using a single camera 3.

FIG. 1 shows an overview of the present automated control system incorporated into an aircraft defined as the "ownship." After the system startup, the process flow shown in FIG. 1 is continuously repeated until the system shuts off. The purpose of the system is to assure that an unpowered glider 2, which may be either the ownship or the target, is controlled to stay in an optimal position behind the towing airplane (or "tug") 7 throughout the duration of the air tow of the glider 2 by the tug 7. A video camera 3 with a field of view 4 is aimed in the approximate direction of a target aircraft 7, which may be manned or unmanned. The video camera 3 is equipped with a means to track its location and attitude as the momentary location array (MLA) in a three-dimensional reference space (3DRS). The video stream is a combination of individual video frames, and the MLA captured at the time of video frame generation. It is transmitted by the video camera to an optical recognition system (ORS) 10. The ORS 10 recognizes the target by having access to the target's key dimensions (span, length, height, distance from the center of gravity to the tow rope's attachment point) and to the length of the tow rope. As long as the glider is being towed, its distance between the attachment points cannot exceed the length of the tow rope, but due to atmospheric and other disturbances, it may be less than that length. The ORS 10 determines the range and bearing in the 3DRS 15 from the center of gravity of the ownship to the center of gravity of the target, as well as the attitudes in the same space of the ownship and the target for each video frame processed by it. How this is done in the simplest embodiment of the ORS 10 is shown in FIG. 25. The resulting data set of the glider's position and its angles relative to the limit sphere, also known as the range, bearing, and attitudes (RBA) data, is then transmitted to the controller 12. Comparing the RBA data with the same data from previous video frames, the controller 12 determines the current dynamic state vector of the glider (DSVG), which may be either aircraft. The controller 12 then determines the difference between the DSVG and a stored desirable state vector and determines the needed corrections to the glider's flight path in the form of flight control command sequences and transmits these command sequences to the interface unit (IU) 14 to the glider's flight controls, which keep executing the command sequences until the DSVG matches the stored desirable state vector.

Figure 2:
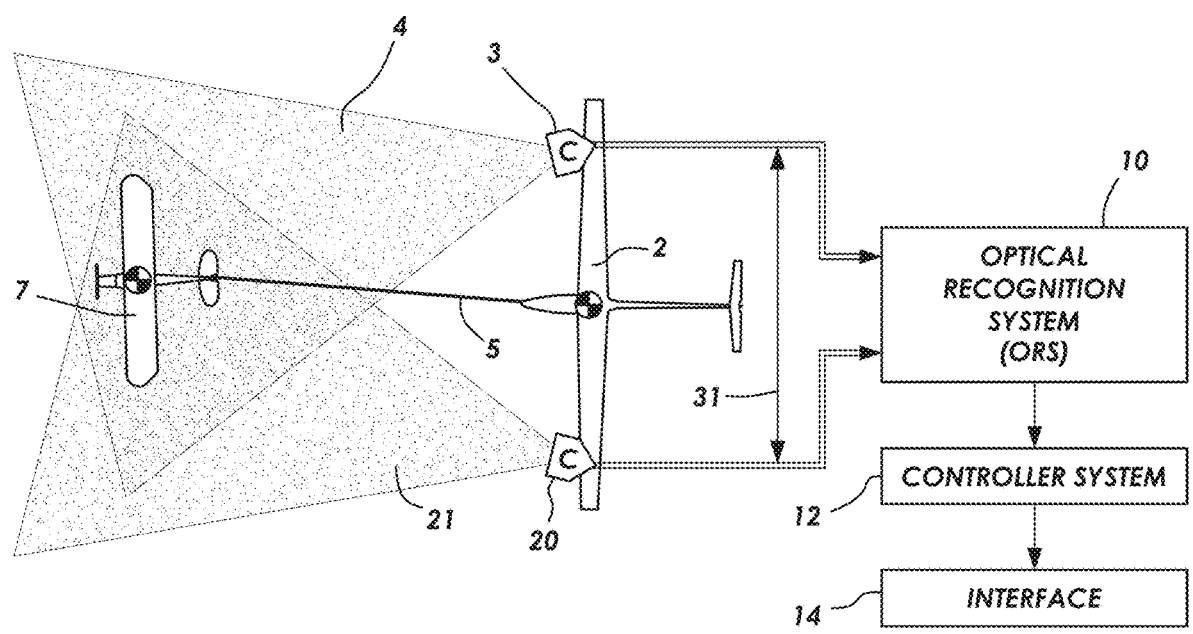
FIG. 2 is a diagram showing an embodiment of the present system adding three-dimensional spatial triangulation.
Figure 24:
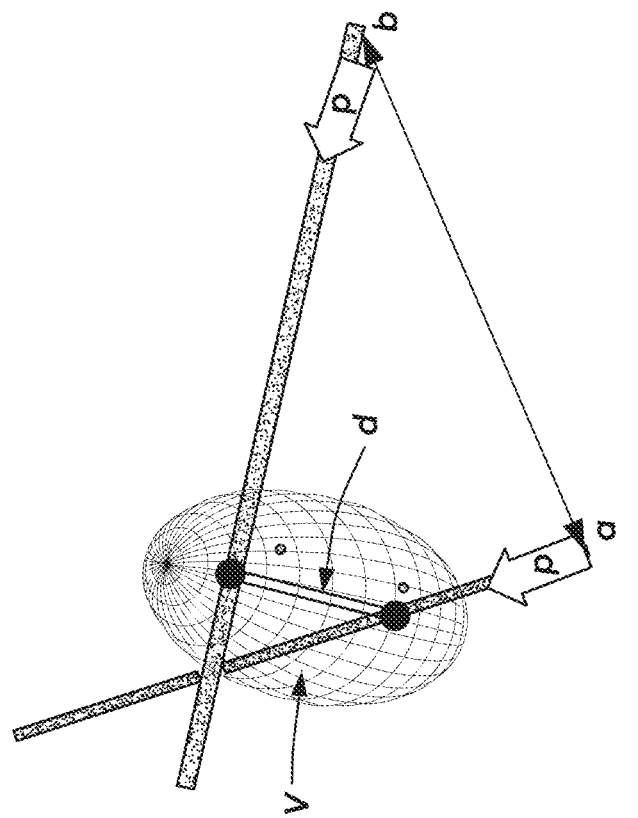
FIG. 24 is a diagram showing triangulation estimate by a stochastic filter.
Figure 24:
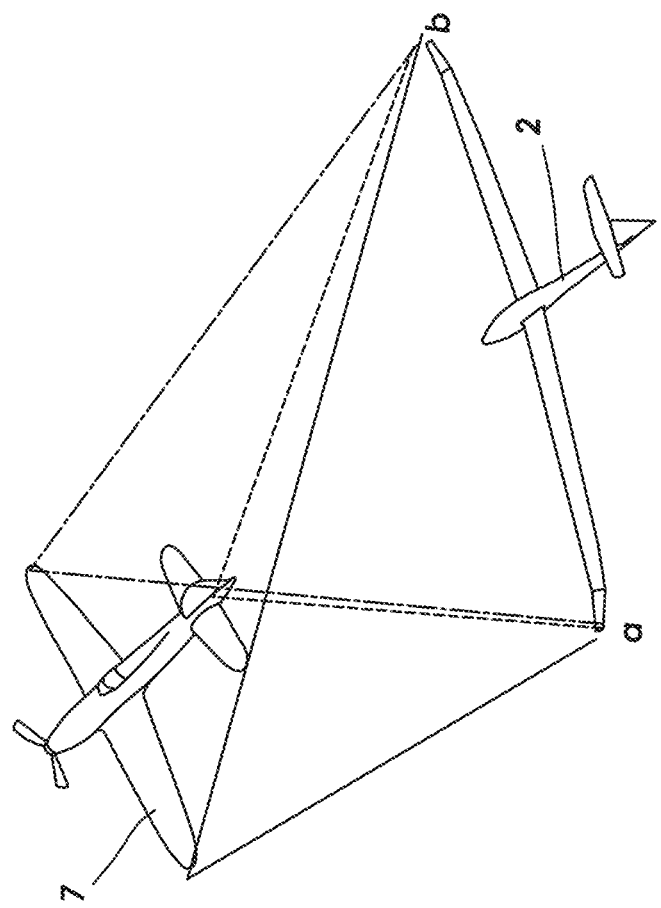
Figure 29:
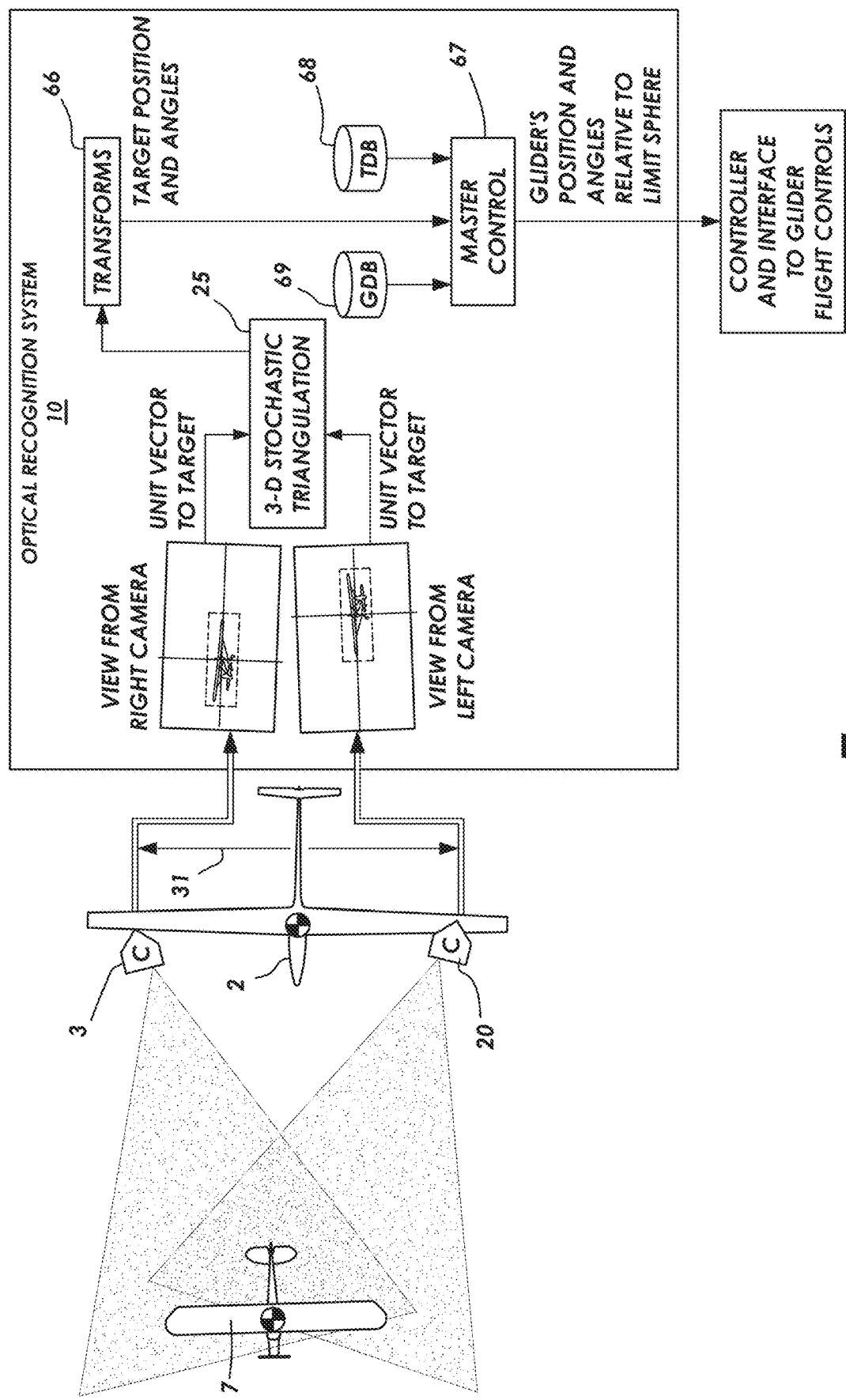
FIG. 29 is a block diagram of the optical recognition system 50 with triangulation allowed by addition of a second camera 20.

FIG. 2 shows an embodiment of the present control system adding three-dimensional spatial triangulation. This embodiment includes a plurality of cameras 3, 20 with fields of view 4, 21 separated by a baseline 31 providing binocular views of the target for the optical recognition system 10. The optical recognition system 10 of this embodiment is illustrated in FIG. 29, with FIG. 24 showing the three-dimensional triangulation approach for estimating the position and attitude of the target 7. In FIG. 29, a second camera 20 is added with a known baseline 31 separating the attachment points of the cameras 3, 20. Adding additional cameras tends to increase the accuracy and decrease the uncertainty of the estimates of the target location.

Figure 3:
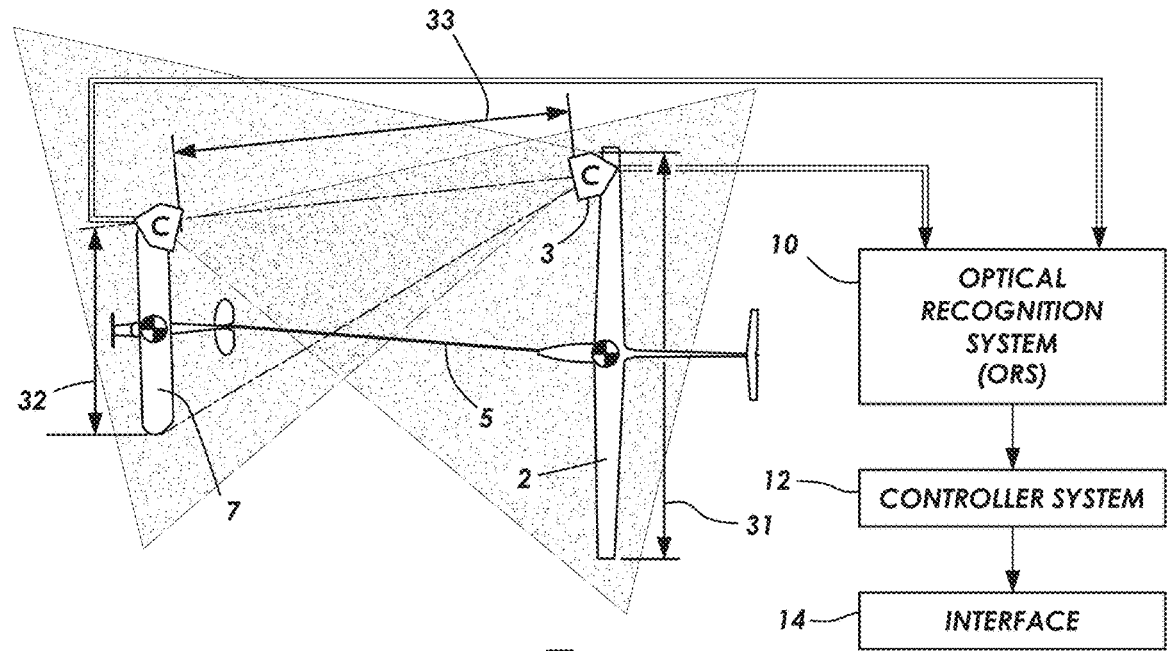
FIG. 3 is a diagram showing another embodiment of the present control system wherein cameras are mounted to the wings of the glider 2 and tug 7 to provide three baselines for redundant binocular view calculations of the target's position and attitude.

FIG. 3 shows another embodiment of the automated control system wherein the cameras are mounted to the wings of the gliders 2 and tug 7 to provide three baselines 31, 32, 33 for redundant binocular view calculations of the target's position and attitude. The optical recognition system 10 can be extended to include three-dimensional triangulation with multiple baselines.

Figure 4:
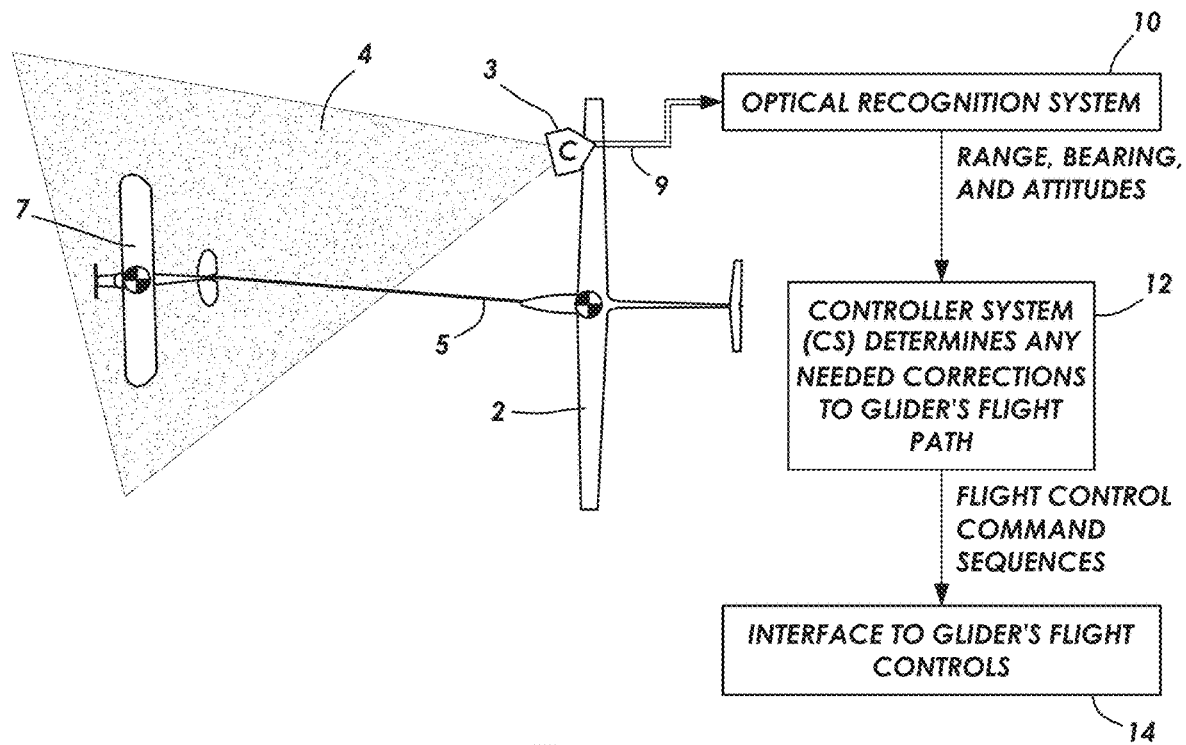
FIG. 4 is a diagram showing an embodiment of the present automated control system wherein the camera 3 is mounted on the glider 2 and the tug 7 is the target.
Figure 5:
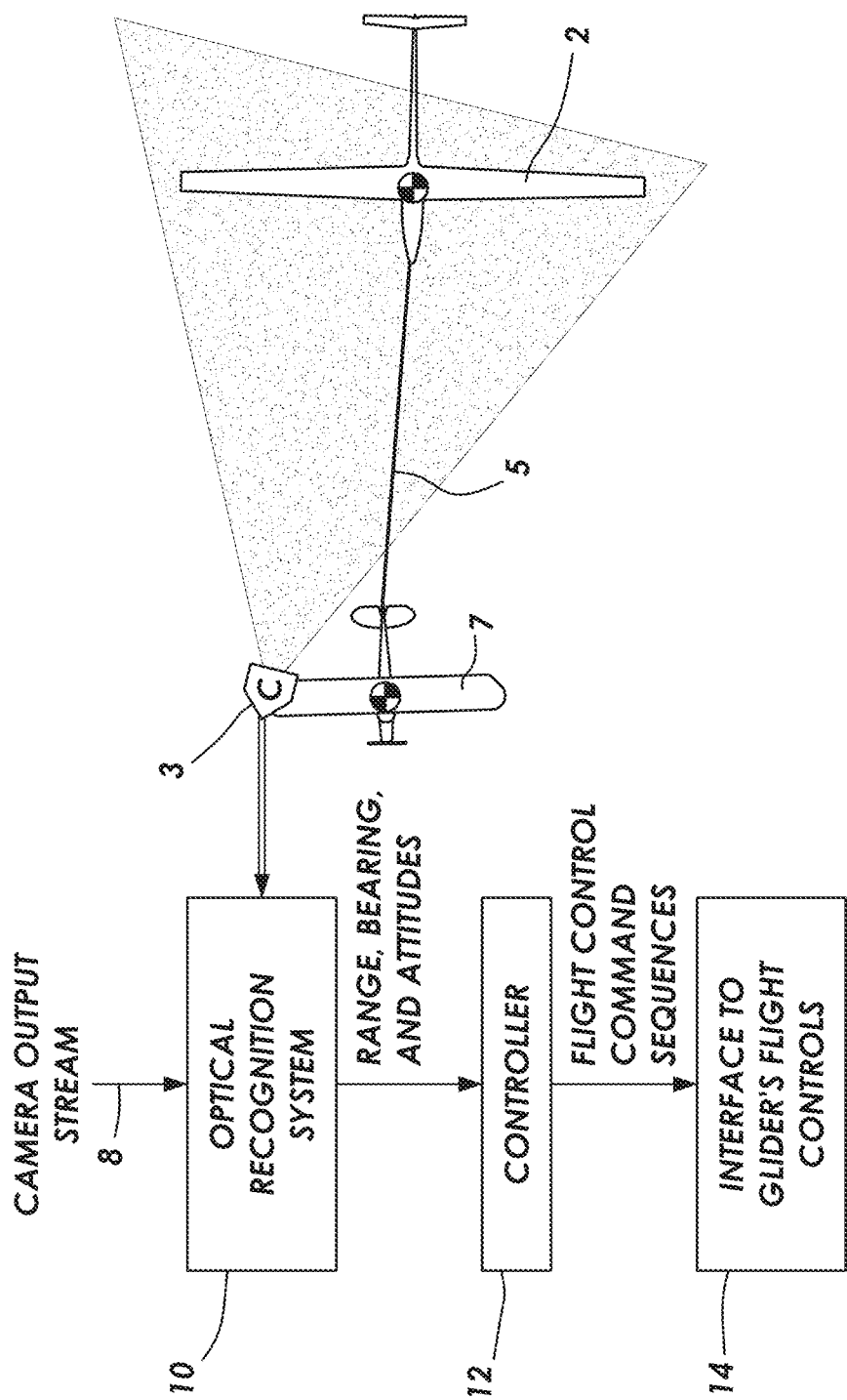
FIG. 5 is a diagram showing an embodiment of the present control system wherein the camera 3 is mounted on the tug 7 and the glider 2 is the target.

FIG. 4 shows an embodiment of the present control system wherein the camera 3 is mounted on the glider 2 and the tug 7 is the target. FIG. 5 shows the automated control system wherein the camera 3 is mounted on the tug 7 and the glider 2 is the target.

Figure 6:
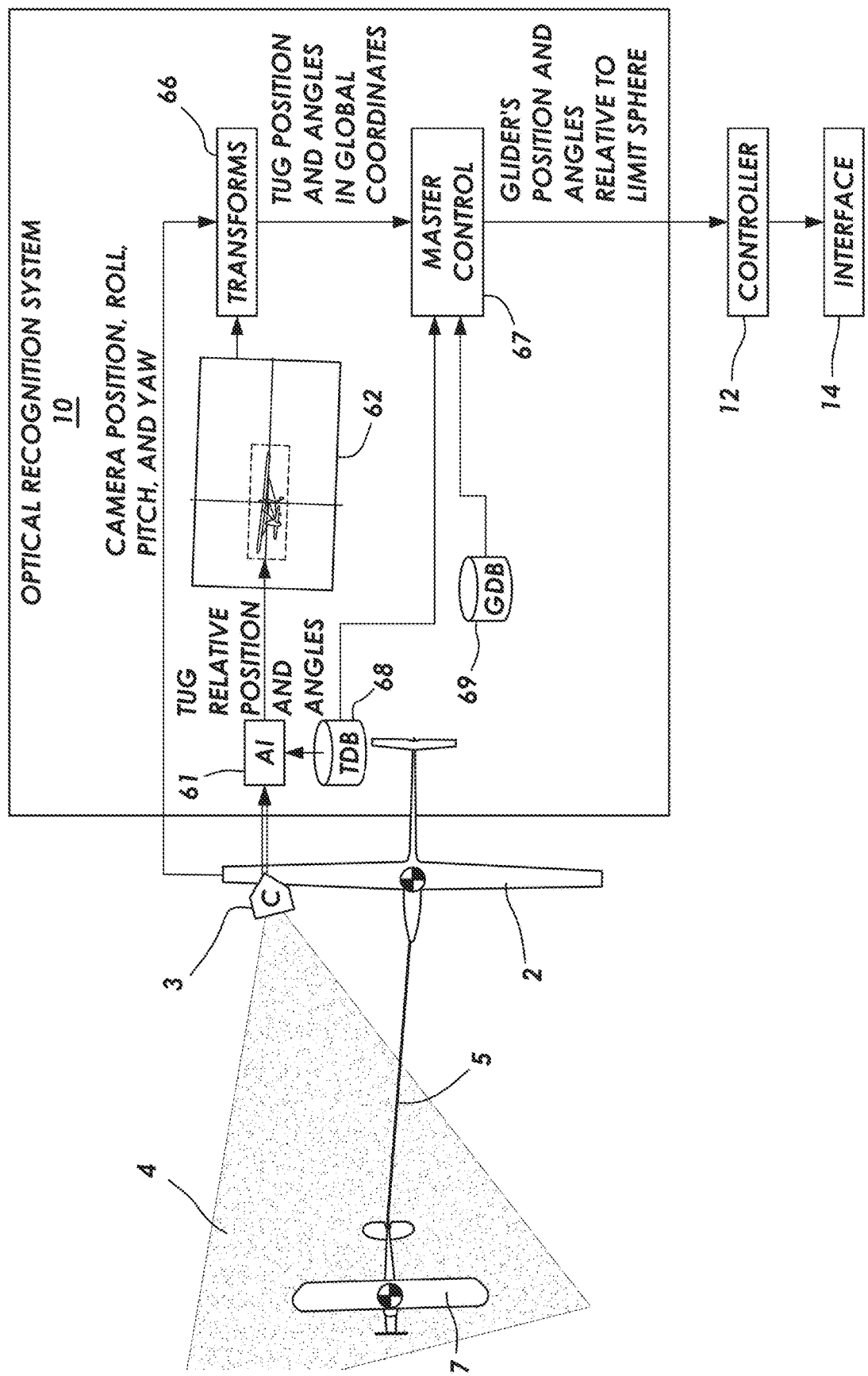
FIG. 6 is a diagram showing an embodiment of the present control system wherein the optical recognition system 10 includes an artificial intelligence system 61 trained to recognize the target 7 and determine its range from the apparent size of the target 7 in images from the camera 3.

FIG. 6 shows an embodiment of the present control system wherein the optical recognition system (ORS) 10 includes an artificial intelligence system (AI) 61 trained to recognize the target 7 and to determine its range from the apparent size of the target 7 in images from the camera 3. The size of the target 7 is contained either in the tug database (TDB) 68 or in the glider database (GDB) 69 depending on whether the target is a glider or a tug. The trained neural nets of the AI component 61 are also stored in either the TDB or the GDB, depending on whether the tug or the glider is the target. The video frame 62 being processed by AI 61 creates a bounding box around the recognized target image, determining the center coordinates $x_1$, $y_1$ of the bounding box as well as the heading, pitch, and roll rotations of the target. The Transforms component 66 of the ORS combines the camera-relative coordinates acquired by the AI system with the camera position and rotations to obtain the positions, target angles from the ownship, and ownship and target attitudes into the reference coordinate system 15. Making use of the tow rope length stored in the tug database, the master control 67 component of the ORS 10 then generates the glider's position and angles relative to the limit sphere 16. These data are then transferred into the controller 12 and interface 14 to the glider flight controls. The master control 67 includes an optional automated pre-flight calibration function discussed below.

Figure 7:
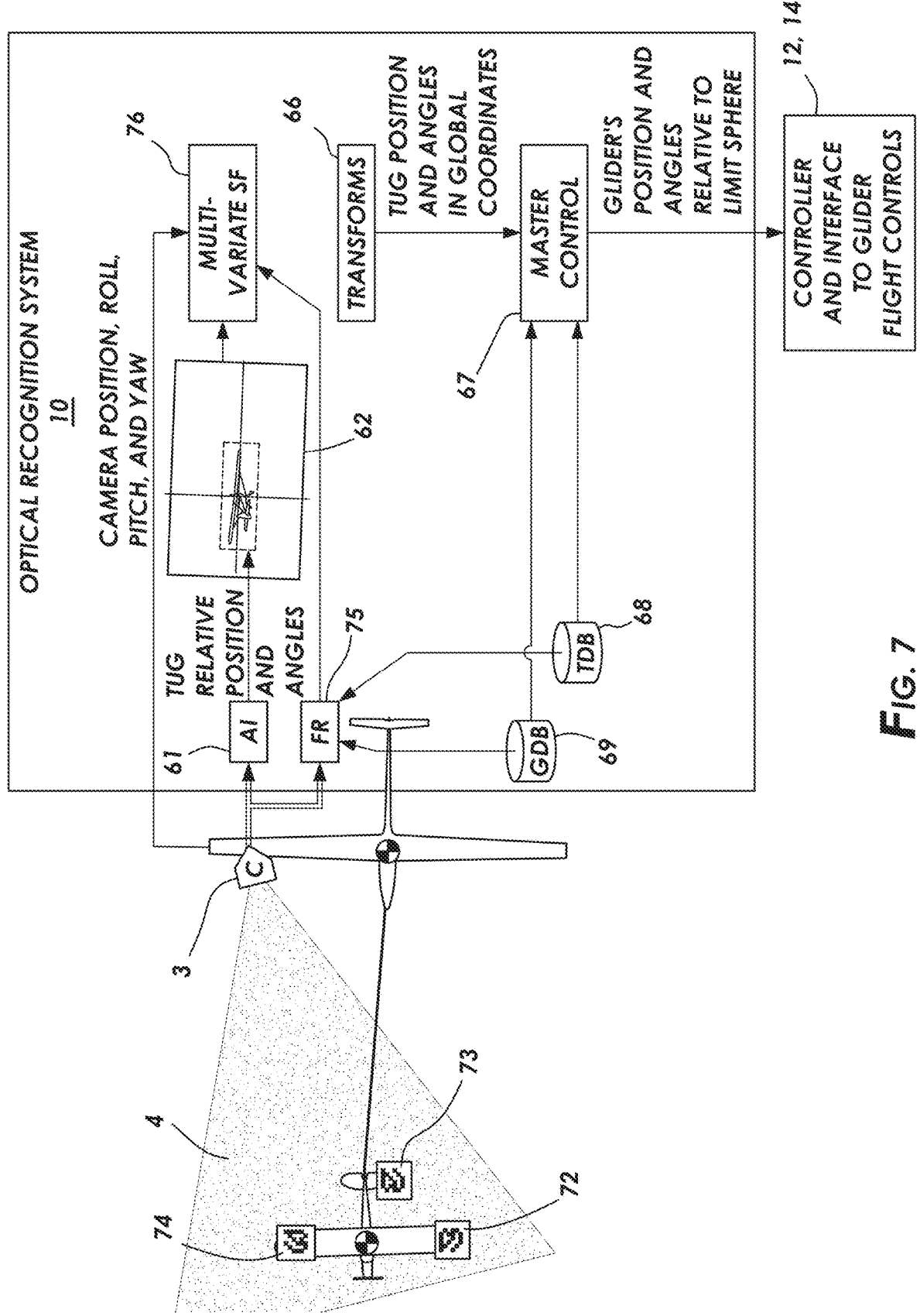
FIG. 7 is a diagram corresponding to FIG. 6 with a plurality of fiducial marks 72-74 on a target aircraft 7.

The embodiment of the present control system shown in FIG. 7 includes a number of fiducial marks 72-74 on the target 7. The enhanced optical recognition system 10 includes a fiducial reader (FR) 75. With the aid of this fiducial mark reader 75, it identifies the target and determines the range and bearing of the target based at least in part on the appearance of the fiducial in images from the camera. Any of a wide variety of fiducials can be used. A commonly known type is the conventional QR code. The different sources of the target position and orientation (in FIG. 7, fiducial readings and AI) may be combined with a multi-variate stochastic filter (SF) 76 to obtain the best position and orientation estimates—these are then transformed into reference coordinates by the Transforms component 66. The master control component 77 then transforms these values into the position and angular coordinates of the glider 2 relative to the limit sphere 16, which are passed to the controller 12 and interface 14 functions of the present control system.

Figure 8:
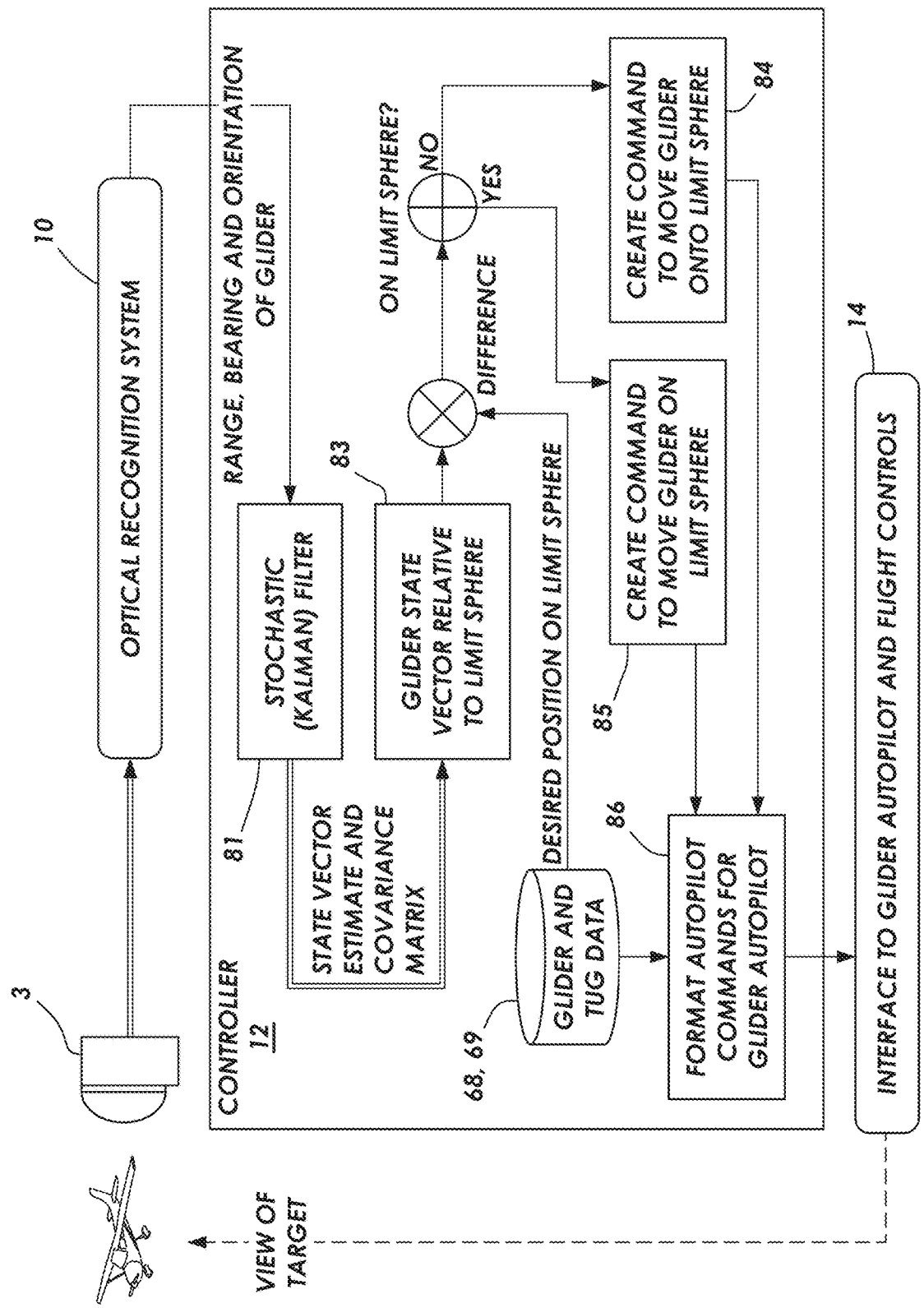
FIG. 8 is a block diagram of the controller 12 adjusting the settings of the autopilot system of the glider 2 via an interface 14 to maintain the desired flight characteristics of the glider 2.
Figure 26C:
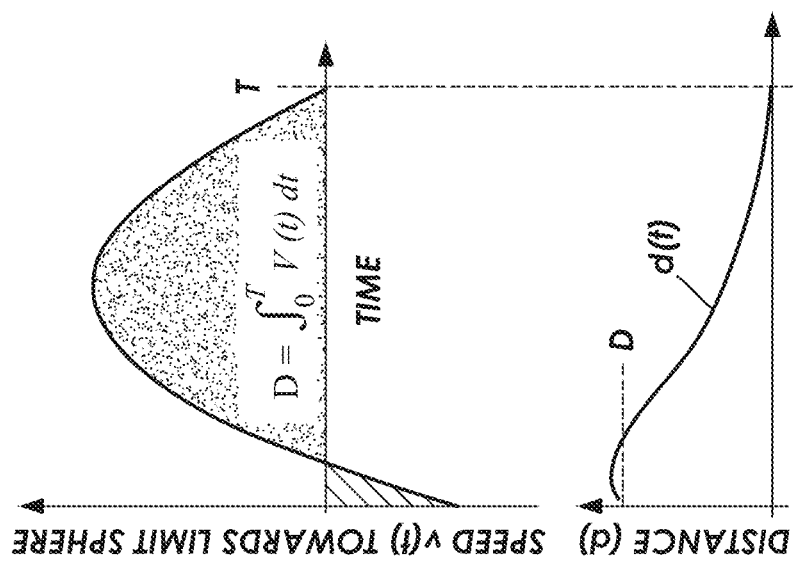
FIGS. 26A, 26B and 26C show three graphs illustrating the requirements for a smooth approach to "landing" on the limit sphere 16.
Figure 26B:
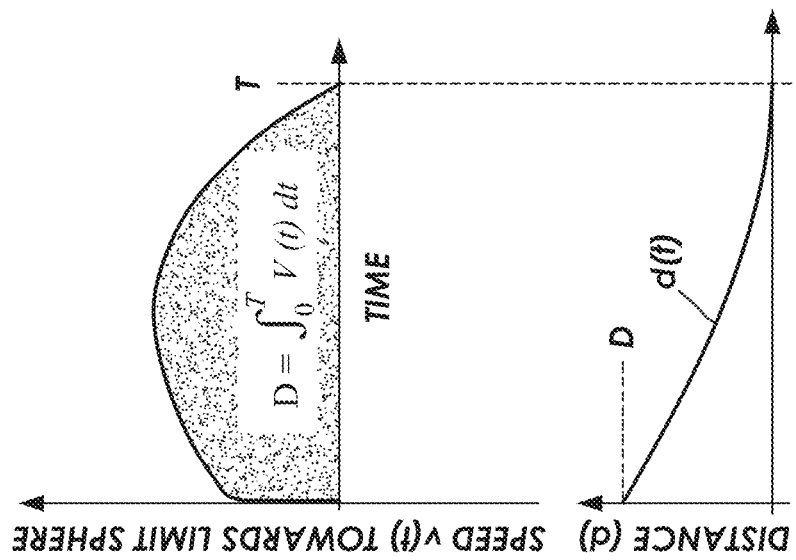
Figure 26A:
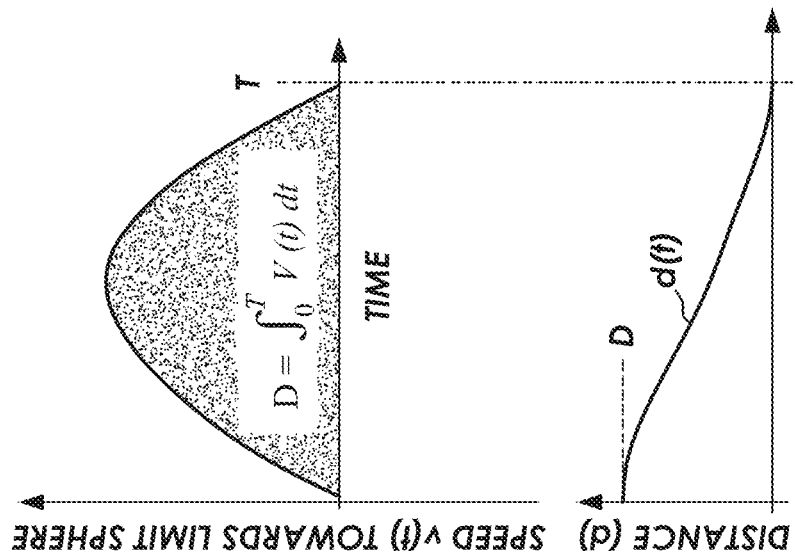

The controller 12 adjusts the settings of the autopilot system of the glider via an interface 14 to maintain the desired flight characteristics of the glider 2, as shown in FIG. 8. The range, bearing, and orientation of the glider 2 relative to the limit sphere 16 are now fed through a stochastic filter 81 that is capable of storing the previous elements of its input data and is thereby capable of generating the momentary glider state vector 83 of the glider, which contains, as a minimum, the three-dimensional values, rates, and accelerations of distance from the limit sphere as well as the glider's orientation in an earth-centered reference space. This momentary state vector 82 is compared with a stored "desired state vector" of the glider. The difference between the two state vectors drives further processing, which may be a single algorithm simultaneously moving the glider to the limit sphere surface if it is not on it and driving it to the desired state vector, which describes a position on the limit sphere. Alternatively, this process of reducing the difference between momentary and desired state vectors may be implemented in two steps shown in FIG. 8—by first, moving the glider onto the limit sphere surface 84 if it is not on, then moving it on the limit sphere to the desired position and orientation 85. In either case, the controller will generate a set of autopilot directives 86 forecast a few seconds into the future. The objective of these directives is: when the glider is inside the limit sphere, it should end up with a zero or near-zero arrival velocity and acceleration on the limit sphere, as shown in FIGS. 26A-26C, in the shortest possible time. To achieve this objective, the controller may consider the elasticity of the tow rope and a limit force or load factor that should not be exceeded during the landing sequence on the limit sphere.

Figure 9:
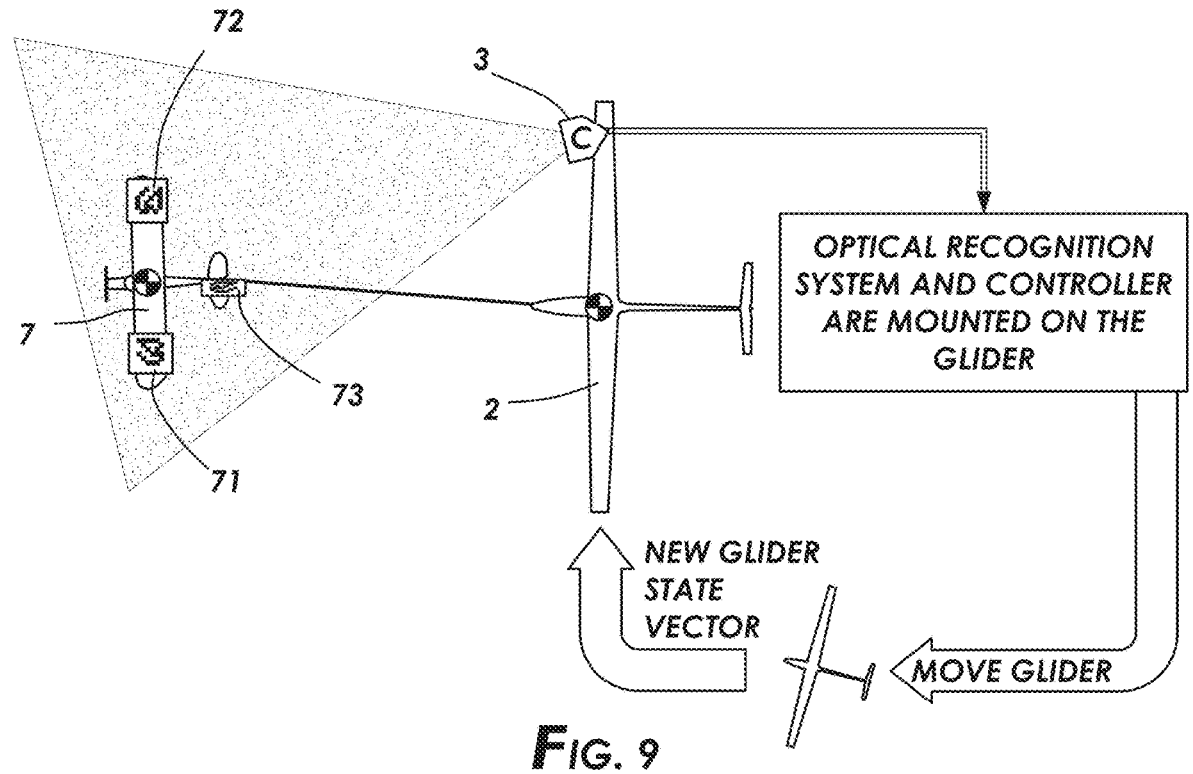
FIG. 9 is a diagram showing an embodiment of the present automated control system carried by a glider 2 towed by a tug airplane 7.

FIG. 9 shows an embodiment of the present automated control system carried by a glider 2 towed by a tug airplane 7. The present control system has: (i) a camera 3 mounted on the glider 2 to view the tug 7; (ii) a number of fiducials 71-73 mounted on the tug 7; (iii) an optical recognition system 10 identifying the tug 7 and determining the range and bearing of the tug 7 based on the flow of video frames, position, and orientation data from the camera 3; (iv) a controller 12 determining corrections to the flight characteristics of the glider 2 in response to the range and bearing data from the optical recognition system 10; and (v) an interface 14 to the flight controls (e.g., autopilot) of the glider 2 to maintain the desired flight characteristics of the glider provided by the controller 12. The commands change the state vector of the glider 2, thereby forming a continuously operating, closed-loop control system.

Figure 10:
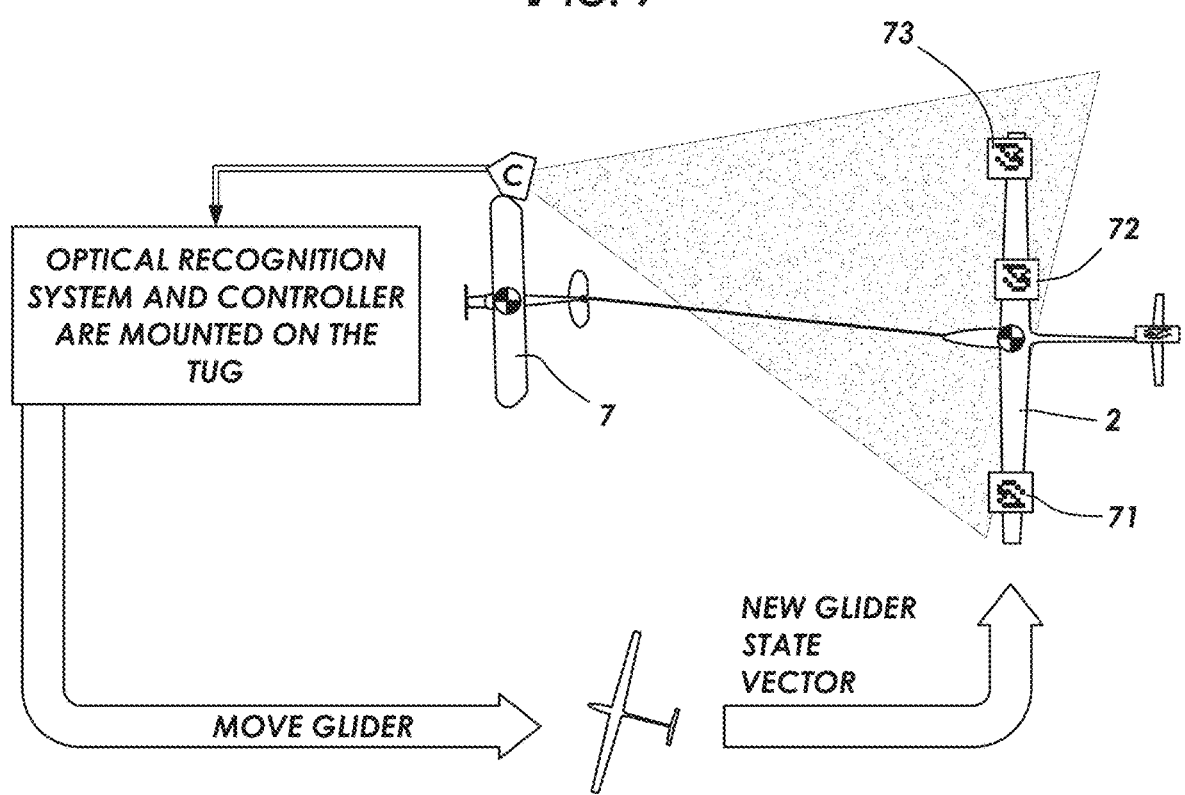
FIG. 10 is a diagram showing an embodiment of the present automated control system carried by a tug aircraft 7 towing a glider 2.

FIG. 10 shows an embodiment of the present control system for a glider 2 with fiducial marks 71-73 towed by a tug aircraft 7 having the system components previously described to maintain the desired flight characteristics of the glider 2 as provided by the controller 12. Here again, the autopilot commands generated by this automated control system change the state vector of the glider 2, thereby forming a continuously operating, closed-loop control system.

Figure 11:
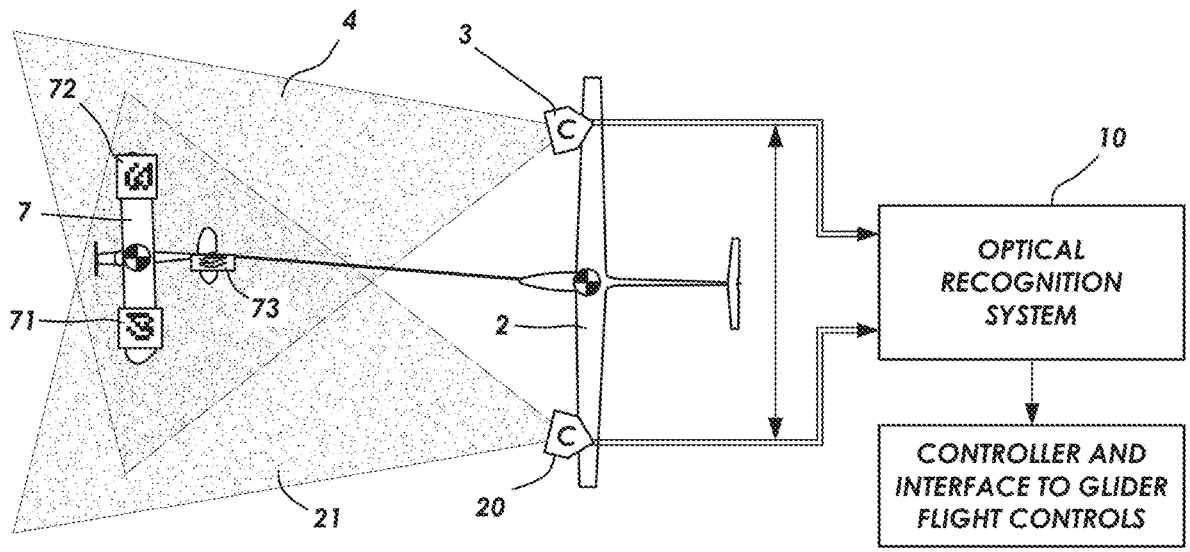
FIG. 11 is a diagram showing an embodiment of the present control system having a plurality of cameras 3, 20 separated by a baseline 31 to provide binocular views of the target 7 for the optical recognition system 10.
Figure 12:
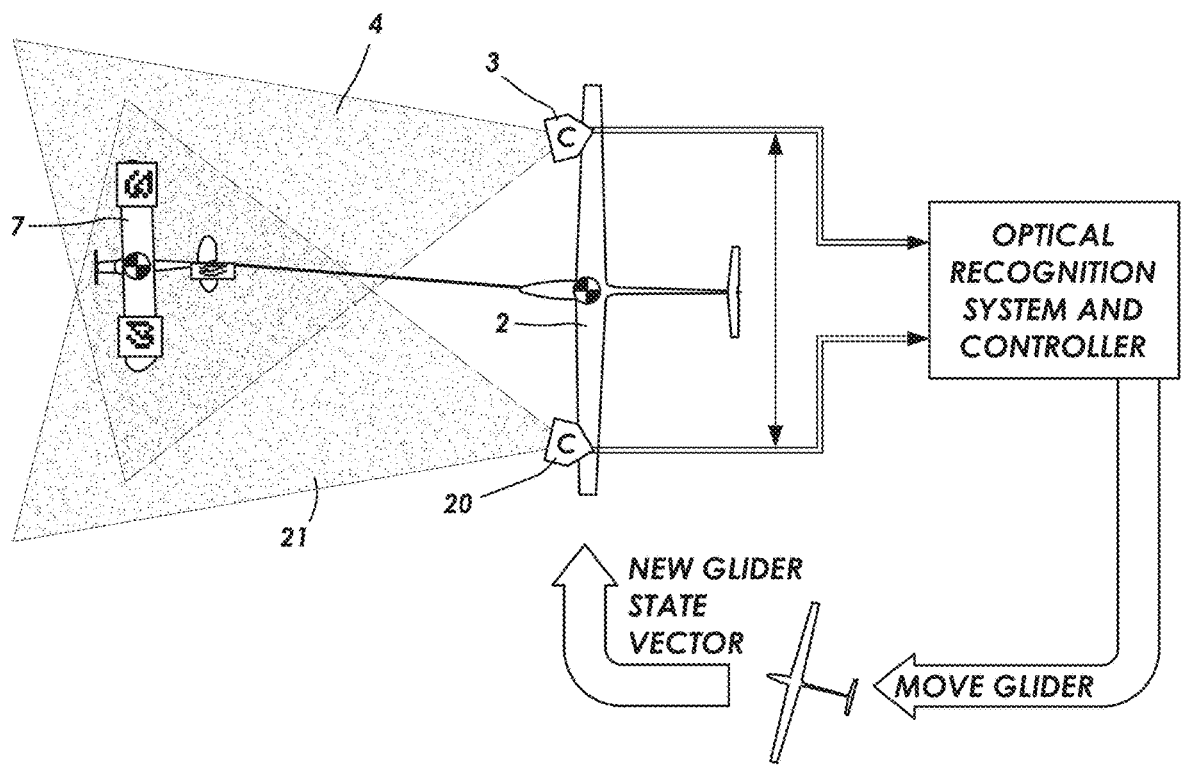
FIG. 12 is a diagram showing the binocular control system configured to view the tug 7 from the glider 2.
Figure 13:
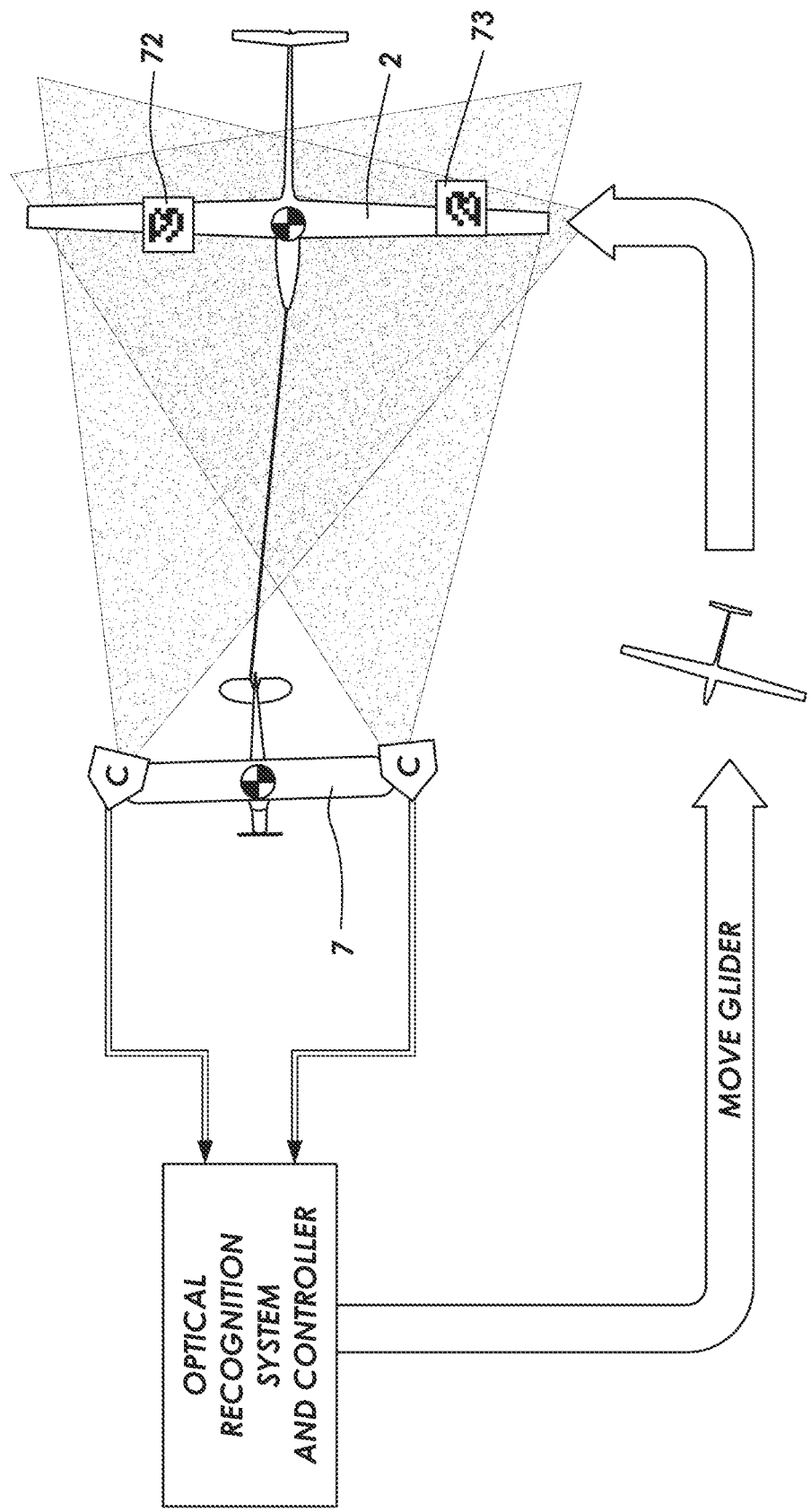
FIG. 13 is a diagram showing the binocular control system configured to view the glider 2 from the tug 7.

FIG. 11 shows another embodiment of the present control system having a plurality of cameras 3, 20 separated by a baseline 31 providing binocular views of the target for the optical recognition system 10. FIG. 12 shows the binocular control system configured to view the tug by the cameras 3, 20 mounted on the glider 2. FIG. 13 shows the binocular control system configured to view the glider 2 by the cameras 3, 20 mounted on the tug 7.

The present control system may include a glider database (GDB) 69 and a tug database (TDB) 68. The GDB 69 typically includes, as a minimum, glider weight, wing loading, minimum speed, maneuvering speed, never-exceed speed, limit and ultimate load factors for the actual flight conditions for each flight, the description location and orientation of any fiducials if mounted on the glider, and AI database of tug characterizations as well as desired state vectors of the glider's position on the limit sphere. The TDB 68 is typically required to contain at least the following elements for each tug type:

a) Characteristic measurements of the tug such as wing span, length, height, lift-to-drag ratio, or polar diagram.
b) Tow rope characteristics: Type (flexible or rod), length, weight per unit length, breaking strength at tug end, breaking strength of weak link, if any.
c) Tug's take-off weight, fuel consumption per hour, initial fuel weight, wing loading, minimum speed, maneuvering speed, never-exceed speed The tug database 68 can be provided for each air tow with the optional fiducial marks on the tug's wing during each flight. FIG. 24 shows why stochastic (Kalman) filtering may be necessary. The left side of the figure shows how a pair of visual sensors of the present system can triangulate various reference points of the tug by elementary algebra. Each intersection of the sight lines from a and b to a common point on the tug defines a distance from the glider; three or more intersections will define the distance and relative attitude of the tug. To perform the necessary computations, each of the measured points of the tug must be in the field of view of the visual sensors (for example, IR or daylight digital cameras). The position and attitude of both cameras must be known, as well as the vertical and horizontal field of view of each camera and the horizontal and vertical pixel count. The attitude of each camera may be time variant due to the elasticity of the glider's airframe; therefore, an attitude sensor must be collocated with each camera. Further, the measurements must be bought to a common time base. Consequently, the above measurements and the process of bringing the measurements to a common time base will be affected by random errors. Therefore, a stochastic filter, such as a Kalman filter, is necessary to create optimal or near-optimal estimates of the intersection points as well as the covariance matrix describing the quality of the estimates. The process is illustrated on the right side of FIG. 24. Due to likely, random measurement errors, the sight lines from a and b are unlikely to meet at a common intersection point in three dimensions. The nearest approach d of the two sight lines, defined by unit vectors K and L, is at a point on each sight line where the line connecting the two points is mutually perpendicular to both sight lines. There are multiple computational approaches to determine the distance d and the location of points k and l. Although the present invention is independent of the method, one approach is shown in Equation 5, where the brackets {x, y, z} denote the mixed triple vector product of the vectors x, y, and z; the symbol x denotes a vector product, and the vertical brackets indicate the absolute value of the enclosed quantity or the length of a vector product. Volume V in FIG. 24 indicates the volume within which the mid-point of the distance d falls within a specified level of certainty (e.g., it is equivalent to a statement that there is a 95% certainty that the mid-point of distance d lies within volume V as computed by stochastic algebraic methods).

$$d = |\{(a-b), K, L\}|/|K \times L| \quad \text{Equation 5}$$

The use of one of the Kalman filter variants will generally yield the corresponding covariance matrix with quick convergence.

Visual Sensing Subsystem (VSS). The VSS comprises one or more video or IR cameras operating at a real-time frame rate. The combined field of view includes all or most of the tug for all likely glider positions and attitudes within the safe volume of slack mode, as described above.

Limit sphere control is a process implemented by software or other means, creating control directives for an autopilot that aims continually to maintain the glider within the optimal target zone T (see FIG. 16), a desired position relative to the tug on the limit sphere 16. By striving to maintain and move the glider through its functions, it creates commands for the various flight controls via the glider interface 14. The limit sphere control implements the following functions:

Take-off Span Capture. When the air tow is initiated, the glider is on the limit sphere, therefore, at a known distance from the tug attachment point. As the movement starts, the visual system captures and processes an image of the tug (FIG. 25) and records the enclosed angle of the wingtips, δ. Knowing the field of view of the visual sensor and the angle δ, this image capture will verify the tug wing span and update the tug database if necessary.

When the glider 2 is on the limit sphere 16, it moves to a desired position, as indicated in FIG. 16. When the glider 2 is in free flight (slack mode) during towing, it returns the glider 2 to the limit sphere 16 as described above. When the glider 2 is required to move forward or aft in the slack mode, it moves the glider 2 in accordance with the objective of reaching a pre-defined position relative to the tug if such a move is physically possible. FIGS. 26A-26C show the requirements for a smooth approach to "landing" on the limit sphere 16. The distance-vs-time function should end with a smooth "landing" on the limit sphere 16 at the end of the recovery sequence from a slack position (that is, one inside the limit sphere), where the glider's speed is controlled only by its altitude loss or gain in accordance with Equation 4. The initial speed in FIGS. 26A-26C is immaterial; the scenario represented by the figure could have started at any time as long as the ending speed, at zero or near-zero distance from the limit speed, is approaching zero relative speed. FIGS. 26A-26C show targeted speeds that are needed to achieve a smooth landing on the limit sphere. It is controlled by altitude loss or gain according to Equation 4. The type of function shown in FIGS. 26A-26C is immaterial as long as it ends at zero or near-zero approach speed to the limit sphere at time T, meeting the distance condition in the figure and satisfies Equation 6, that is that the glider will land on the limit sphere at the end of the sequence, being the distance from the limit sphere, t the time to time T, and V (t) the approach speed to the limit sphere.

$$D(T) = 0 = \int_0^T V(t)dt \quad \text{Equation 6}$$

The control directive generation process is implemented by software or other means (for example by analog control) to generate flight maneuver commands or optional flight director display information aimed to place the glider on the limit sphere (see FIGS. 18A and 18B). Sequences of commands are computed as described below for longitudinal control and lateral control. Within the present control system data are transmitted by its communication system, as discussed above.

Figure 27:
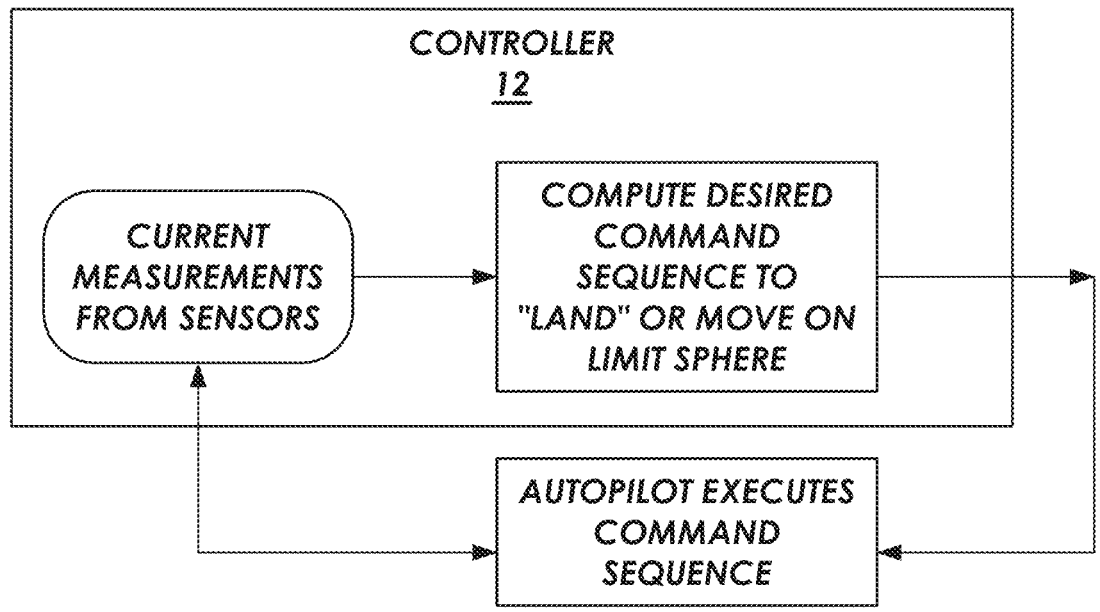
FIG. 27 is a diagram of the feedback control system provided by the interface 14 to the autopilot system of the glider 2.

The longitudinal commands generation process implemented by software or other means generates calibrated or true airspeed directives to implement short-term speed and altitude profiles as discussed above. The timed sequence of control directives is aimed to minimize the tow force beyond the normal tow force, aiming for near-zero acceleration upon setting the glider on the limit sphere. Because it is a timed sequence which may be affected by unanticipated random effects during its execution, it requires a feedback control system as shown in FIG. 27. This subsystem process provides speed and altitude change commands to a conventional autopilot system on the glider 2.

The lateral commands generation process is a feedback control subsystem as diagrammed in FIG. 27, implemented by software or other means providing lateral movement of the glider relative to the tug with the objective of placing the glider in a position indicated by FIGS. 17A and 17B and the related discussion.

Dive brake command generation is an optional process defining a feedback control subsystem that can be implemented by software or other means, to provide dive brake or spoiler deflection time sequences to the glider's autopilot or flight director. If dive brake or spoiler systems are installed under autopilot control in the glider, the dive brake commands generation option will improve the effectiveness of the longitudinal commands generation process by providing much larger sink rates than otherwise possible, as described above.

Tug flight condition data may be transmitted to the master control if it has a provision to accept the information to update current tug mass data used by the stochastic (e.g., Kalman) filters in the glider's control processes.

Figure 28:
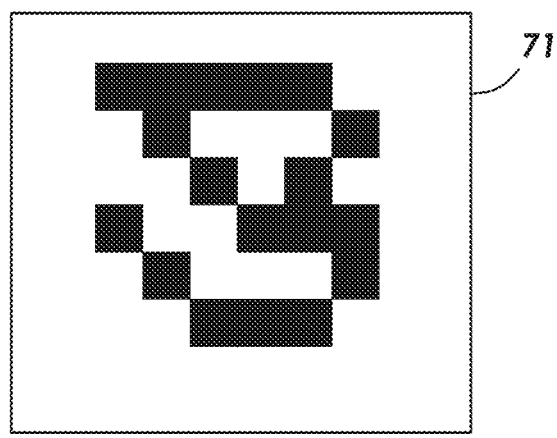
FIG. 28 shows an example of a fiducial mark 71.

Fiducial marks 71 (as shown in FIG. 28) may be placed on the tug in positions that would be visible from all or most of the glider when it is on the surface of or within the limit sphere. These tags, when placed in known size and orientation and identified by a visual sensing system located on the glider, will provide references for computing the glider's position and attitude relative to the tug. The tug-mounted fiducials are optional because the glider's software code or alternate means of recognition can use the tug itself as the marker.

Tug as Optional Position Marker. If this option is implemented, AI (Artificial Intelligence) training and validation are required to recognize typical tug configurations. AI training requires a large number of tug images from various glider positions and orientations. The required training images may be obtained with relative ease, as a single air tow lasting 30 minutes will yield, at a 60 Hz frame rate, approximately 100,000 image frames in different positions, both on the limit sphere and in slack conditions.

Automated Calibration by Fiducials. The fiducial mark 71 seen in FIG. 28 represents approximately 68 billion different combinations (over 8 gigabytes). It can provide each fiducial's size and any additional data. For automated calibration, only a few kilobytes of information are needed (fiducial size, angular, and position limits). A fiducial is captured at the launching base if the tug is not marked by fiducials; otherwise, auto-calibration is performed in flight.

Figure 22A:
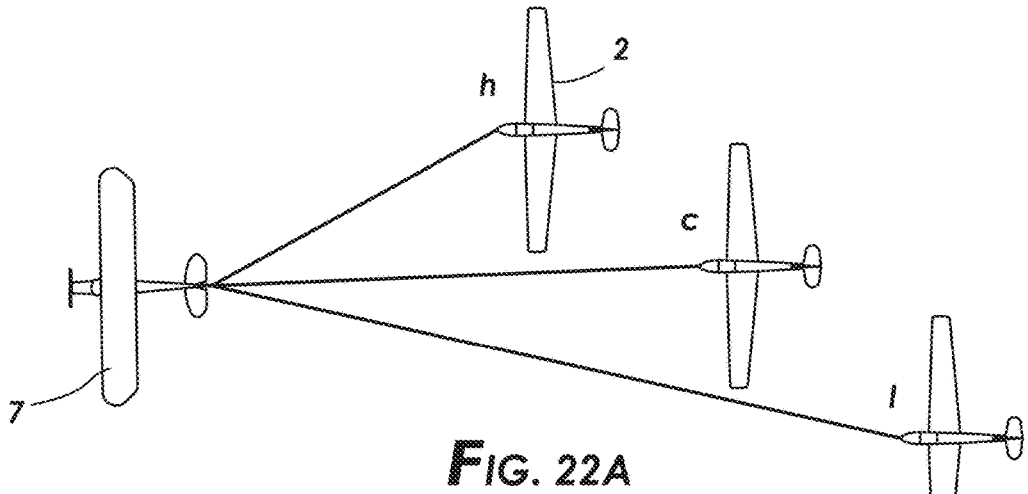
FIGS. 22A and 22B are diagrams of an air tow of multiple gliders by a single tug.
Figure 22B:
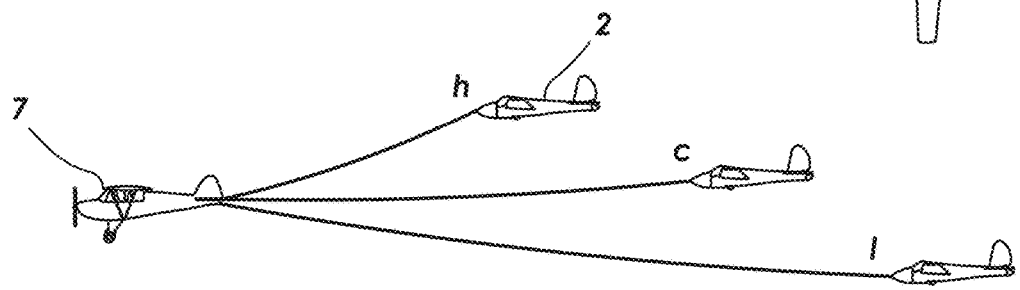

Multiple Gliders in Air Tow. Typical of this arrangement is two or three gliders 2 in air tow, as shown in FIGS. 22A and 22B. The glider in the high position (h) has the shortest tow rope, the glider in the center position (c) is approximately level with the tug with a medium length tow rope, the glider in the lowest position (l) has the longest tow rope. Tow rope lengths ensure fore-aft separation between gliders that is at least one glider length or approximate lateral positions so that the left wingtip of (h) stays well to the right of the tow rope of (c) and the left wingtip of (c) stays well clear of the tow rope of (l). The above lateral control responsibilities fall upon (h) and (l), respectively. The preferred release order from the tow is: Release (l), Release (c), Release (h).

Figure 23B:
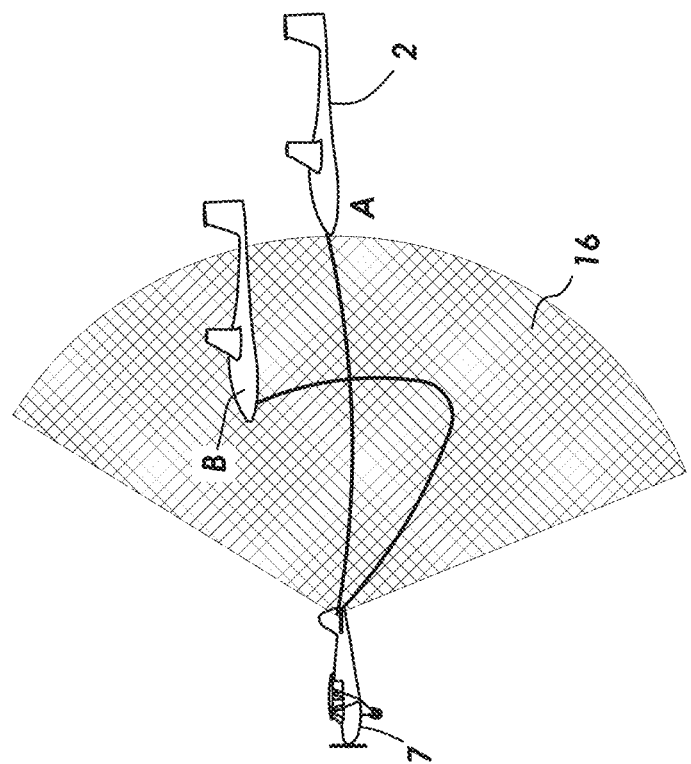
FIGS. 23A and 23B are diagrams of an air tow of a single glider by multiple tugs.
Figure 23A:
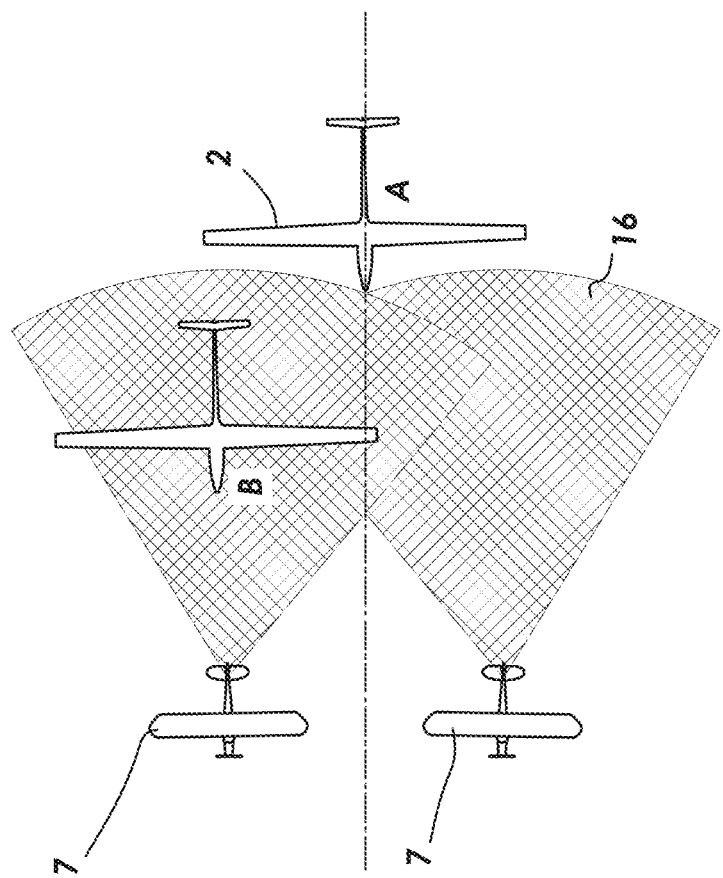

Multiple Tugs, Single Glider. FIGS. 23A and 23B illustrate this combination, which was used in World War II US and British glider operations. The top view in FIG. 23A illustrates the limit spheres imposed by two tugs. While on the limit spheres, this constrains the glider to the intersection of the two limit spheres (position A in FIGS. 23A and 23B). However, the typical slack condition evolves as a consequence of air turbulence; the glider, due to its generally much higher L/D than the tug, will accelerate forward (position B in FIGS. 23A and 23B). The algorithms to bring the glider back into position A are identical to the ones used in the single-glider, single-tug case and assure that the glider "lands" with minimum force on both of the limit spheres.

Figure 14:
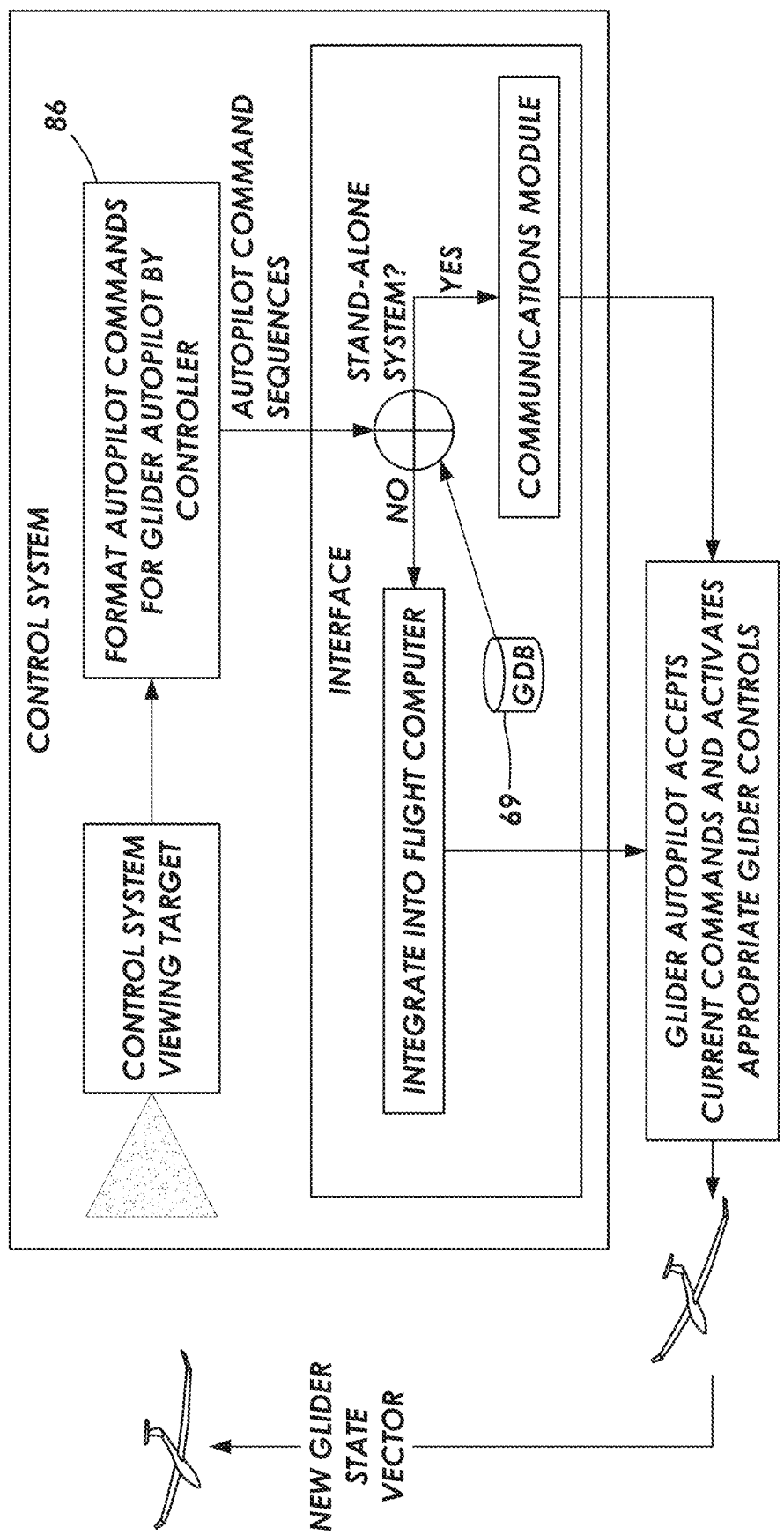
FIG. 14 is simplified block diagram of the interface 14 to the glider controls.

Data transfer between system sensors and processes requires real time update rates by a communications module (see FIG. 14). While this may be performed well at 10 Hz, contemporary hardware can provide much higher data and processing rates. The performance specification of the internal and external communication systems is beyond the scope of this disclosure, as it largely depends on the dynamic characteristics of the tug and the glider and is, therefore, a matter of user choice. Typically, the more massive the tug and glider, the lower the required data update rate.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. An automated control system for a glider towed by a tug airplane ("tug") comprising:
   a camera mounted on one of the glider and tug to view the other of the glider and tug (the "target");
   an optical recognition system receiving images from the camera and determining the relative range and bearing of the target;
   a controller determining corrections to the flight characteristics of the glider in response to the range and bearing data from the optical recognition system to maintain a desired relative position of the glider relative to the tug while the glider is towed by the tug; and
   an interface to the flight controls of the glider maintaining the desired flight characteristics of the glider provided by the controller while the glider is towed by the tug.

2. The automated control system of claim 1 further comprising a plurality of cameras separated by a baseline providing binocular views of the target for the optical recognition system.

3. The automated control system of claim 2, wherein the cameras are mounted to the wings of one of the glider and tug to provide a baseline for binocular views of the target.

4. The automated control system of claim 1 wherein the camera is mounted on the glider, and the tug is the target.

5. The automated control system of claim 1 wherein the camera is mounted on the tug and the glider is the target.

6. The automated control system of claim 1 wherein the optical recognition system further comprises an artificial intelligence system trained to recognize the target and to determine its range from the apparent size of the target in images from the camera.

7. The automated control system of claim 1 further comprising a fiducial mark on the target, wherein the optical recognition system identifies the target and determines the range and bearing of the target based at least in part on the appearance of the fiducial mark in images from the camera.

8. The automated control system of claim 1 wherein the controller adjusts the settings of the autopilot system of the glider via the interface to maintain the desired flight characteristics of the glider.

9. The automated control system of claim 1 wherein the controller determines corrections to the flight characteristics of the glider to maintain a towing force less than a predetermined maximum value.

10. An automated control system for a glider towed by a tug airplane ("tug") comprising:
- a camera mounted on the glider to view the tug;
- a fiducial mark on the tug;
- an optical recognition identifying the tug and determining the range and bearing of the tug based at least in part on the appearance of the fiducial mark in images from the camera;
- a controller determining corrections to the flight characteristics of the glider in response to the range and bearing data from the optical recognition system to maintain a desired relative position of the glider relative to the tug and maintain a towing force less than a predetermined maximum value while the glider is towed by the tug; and
- an interface to the flight controls of the glider maintaining desired flight characteristics of the glider provided by the controller while the glider is towed by the tug.

11. The automated control system of claim 10 further comprising a plurality of cameras separated by a baseline providing binocular views of the tug for the optical recognition system.

12. The automated control system of claim 11 wherein the cameras are mounted to the wings of the glider to provide a baseline for binocular views of the tug.

13. The automated control system of claim 10 wherein the optical recognition system further comprises an artificial intelligence system trained to recognize the fiducial mark, and to determine the range of the tug from the apparent size of the fiducial mark in images from the camera.

14. The automated control system of claim 10 wherein the controller adjusts settings of the autopilot system of the glider via the interface to maintain desired flight characteristics of the glider.

* * * * *